US006675404B2

(12) United States Patent
Brennan et al.

(10) Patent No.: US 6,675,404 B2
(45) Date of Patent: *Jan. 13, 2004

(54) FLOW CONTROL DEVICE FOR TUB, SPA, OR SHOWER

(75) Inventors: Anthony Brennan, Niskayuna, NY (US); W. John Gardenier, Albany, NY (US)

(73) Assignee: Saratoga Spa & Bath Co., Inc., Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/896,906

(22) Filed: Jun. 29, 2001

(65) Prior Publication Data

US 2003/0000009 A1 Jan. 2, 2003

(51) Int. Cl.[7] .................................................. A47K 3/00
(52) U.S. Cl. ........................... 4/541.1; 4/541.3; 4/541.6
(58) Field of Search .............................. 4/541.1–541.6, 4/675; 137/625.16; 239/447

(56) References Cited

U.S. PATENT DOCUMENTS

| | | | |
|---|---|---|---|
| 732,714 A | | 11/1903 | Guese |
| 800,125 A | | 9/1905 | Beresford |
| 1,016,382 A | | 2/1912 | Weeden |
| 1,589,178 A | | 6/1926 | Kenyon |
| 2,077,674 A | | 4/1937 | Coyle |
| 2,102,503 A | * | 12/1937 | Auger |
| 3,773,078 A | * | 11/1973 | Suntheimer |
| 3,874,413 A | * | 4/1975 | Valdez |
| 4,285,365 A | | 8/1981 | Coats et al. ................. 137/625 |
| 4,584,781 A | | 4/1986 | Parkinson et al. ............. 34/92 |
| 4,918,768 A | * | 4/1990 | DeSousa et al. |
| 4,972,876 A | | 11/1990 | Kabata et al. .............. 137/625 |

(List continued on next page.)

FOREIGN PATENT DOCUMENTS

EP          0 210 959 A1       2/1987

Primary Examiner—John Rivell
Assistant Examiner—Amanda Flynn
(74) Attorney, Agent, or Firm—Heslin Rothenberg Farley & Mesiti P.C.; Nicholas Mesiti, Esq.; Victor A. Cardona, Esq.

(57) ABSTRACT

A system for control of water delivery to an interior of a tub, spa or shower includes a plurality of ports and a flow control device. The plurality of ports is adapted to be located on a surface of the tub, spa, or shower and the plurality of ports is configured to transmit water to an interior of the tub, spa, or shower. A first pipe of the flow control device includes a plurality of elongated inlets and a second pipe includes a plurality of outlets in fluid communication with the plurality of ports. The first pipe or the second pipe is moveable, one relative to the other. Moving of the first pipe or the second pipe to a first position serves to cause communication of an elongated inlet of the plurality of elongated inlets with a first outlet of the plurality of outlets. The first outlet is in fluid communication with a first port of the plurality of ports. The communication of the inlet with the first outlet serves to allow flow of water from a water source, when in fluid communication with the flow control device, to the inlet to the first outlet to the first port to the interior of the tub, spa or shower. The moving of the first pipe or the second pipe also serves to block a second outlet of the plurality of outlets with a solid portion of the first pipe. The second outlet is in fluid communication with a second port of the plurality of ports. The blocking of the second outlet with the solid portion serves to prevent flow of water from the water source to the second port to the interior of the tub, spa or shower. Moving of the first pipe or the second pipe to a second position of the plurality of positions serves to allow the first elongated inlet to remain in fluid communication with the first outlet and the first outlet to remain in fluid communication with the first port.

20 Claims, 20 Drawing Sheets

U.S. PATENT DOCUMENTS

| | | | |
|---|---|---|---|
| 5,097,840 A | 3/1992 | Wallace et al. | 128/672 |
| 5,343,893 A * | 9/1994 | Hogan et al. | |
| 5,417,243 A | 5/1995 | Ragona | 137/625 |
| 5,457,825 A * | 10/1995 | Holtsnider | 4/541.1 |
| RE35,866 E | 8/1998 | Simmons | 239/17 |
| 5,816,290 A | 10/1998 | Allshuler | 137/625 |
| 5,848,611 A | 12/1998 | Stanevich | 137/625 |
| 5,862,545 A | 1/1999 | Mathis et al. | 4/662 |
| 5,898,958 A * | 5/1999 | Hall | 4/541.1 |
| 5,915,622 A | 6/1999 | Foote | 239/10 |
| 6,000,073 A | 12/1999 | Eddington | 4/451 |
| 6,185,757 B1 * | 2/2001 | Gardenier et al. | 4/541.1 |

* cited by examiner

1

FLOW CONTROL DEVICE FOR TUB, SPA, OR SHOWER

TECHNICAL FIELD

This invention relates, generally, to water flow into tubs, spas or showers and, more particularly, to control of water delivery through ports in tubs, spas or showers.

BACKGROUND ART

Tubs, spas or showers generally have a number of fluid flow ports or nozzles. Each flow port usually transmits or jets water or a water-air froth into the tub, spa or shower. Enhanced treatment or enjoyment for a user typically results from increased control over the flow of fluid to the tub, spa or shower.

One design employs a multi-ported valve having a handle to allow a user to rotate an inner cylindrical member relative to an outer cylindrical casing for selective alignment of ports of the inner cylindrical member and ports of the outer cylindrical member, for selective flow among a water supply and recirculating system, a spa, and a swimming pool. For instance, the user can manually rotate the handle to align a first port for flow of water to the spa and a second port for flow of water from the spa, and then the user can further manually rotate the handle to stop the flow of water to move from the spa and instead align the first port for flow of water to the swimming pool and align the second port for flow of water from the swimming pool. These first and second ports are the only ports for water flow between the valve and the spa for between the valve and the swimming pool. For example, the manual rotation of the handle by the user does not allow selection among individual ones, sets, or subsets of ports for water flow into the spa. Such a design is disclosed in U.S. Pat. No. 3,874,413 issued to Valdez.

Another configuration includes an air valve for spas and baths. Air is drawn from the air valve to a jet by a venturi effect created by coupling of a water pump to the jet. A knob is manipulated by a user to selectively cause full, partial, or no air flow from the air valve to the jet. The air valve includes a housing having a port and a slot, and a barrel having a port. A user can turn the knob connected with the barrel, to cause selective flow or blockage of air, by selectively aligning the port of the barrel with the slot or port of the housing, or by selectively blocking the port of the barrel by aligning neither the slot nor port of the housing with the port of the barrel. In this configuration, only one jet delivers water from the pump to the spa or bath. The manual turning of the knob by the user does not allow selection among individual ones, sets, or subsets of ports for water flow into the spa or bath. The manipulation of the knob simply selects the quantity of air content in the flow through the jet. Such a configuration is disclosed in U.S. Pat. No. 4,918,768 issued to DeSousa et al.

Another aspect of such systems results from the pressurized water and air utilized to provide a therapeutic effect to a user. The pressurized water and/or air may result in "hammering" or pressure buildup in such devices which may result in damage thereto. One method of preventing damage due to such pressure buildup is to provide for a pressure relief valve which may allow water and/or air to escape from such a system when pressure in the system rises above an acceptable level.

Thus, a need exists for increasing selectability and/or controllability of water delivery to a tub, spa or shower while reducing the likelihood that pressure build-up will cause damage to such a system.

SUMMARY OF THE INVENTION

In one aspect of the invention, a system for user control, of water delivery to an interior of a tub, spa or shower includes a plurality of ports and a flow control device. The plurality of ports are adapted to be located on a surface of the tub, spa or shower, and are configured to transmit water to the interior of the tub, spa, or shower. The flow control device is adapted for fluid communication with a water source and includes a first pipe and a second pipe. The first pipe includes a plurality of elongated inlets and the second pipe includes a plurality of outlets in fluid communication with the plurality of ports. The first pipe or the second pipe is movable, one relative to the other. Moving of the first pipe or the second pipe to a first position of the plurality of positions serves to cause communication of an elongated inlet of the plurality of elongated inlets with a first outlet of the plurality of outlets. The first outlet is adapted for fluid communication with a first port of the plurality of ports. The communication of the elongated inlet with the first outlet serves to allow flow of water from the water source, when in fluid communication with the flow control device, to the elongated inlet to the first outlet to the first port to the interior of the tub, spa or shower. The moving of the first pipe or the second pipe to the position also serves to block a second outlet of the plurality of outlets with a solid portion of the first pipe. The second outlet is adapted for fluid communication with a second port of the plurality of ports. The blocking of the second outlet with the solid portion serves to prevent flow of water from the water source, when in fluid communication with the flow control device, to the second port to the interior of the tub, spa or shower. Moving of the first pipe or the second pipe to a second position of the plurality positions serves to cause the first elongated inlet to remain in fluid communication with the first outlet and the first outlet to remain in fluid communication with the first port.

In a second aspect of the invention, a system for control of water delivery to an interior of a tub, spa or shower includes a plurality of ports and a flow control device. The plurality of ports are adapted to be located on a surface of the tub, spa or shower and are configured to transmit water to the interior of the tub, spa or shower. The flow control device is adapted for fluid communication with a water source and includes a first pipe and a second pipe. The first pipe includes a plurality of elongated inlets and the second pipe includes a plurality of outlets in fluid communication with the plurality of ports. The first pipe or the second pipe is moveable, one relative to the other. At least one elongated inlet of the plurality of elongated inlets remains in fluid communication with at least one outlet of the plurality of outlets throughout the plurality of positions.

In a third aspect of the invention, a system for control of water delivery to an interior of a tub, spa, or shower includes the plurality of ports and a flow control device. The plurality of ports is adapted to be located on a surface of the tub, spa, or shower and is configured to transmit water to the interior of the tub, spa, or shower. The flow control device is adapted for a flow communication with a water source and includes a pipe having a plurality of elongated inlets. The pipe is movable among a plurality of positions and at least one elongated inlet of the plurality of elongated inlets is in fluid communication with at least one port of the plurality of ports through the plurality of positions.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a user may control a flow control device to select and/or control water delivery through particular ones, sets, or subsets of ports in a tub, spa or shower.

Figure 1:
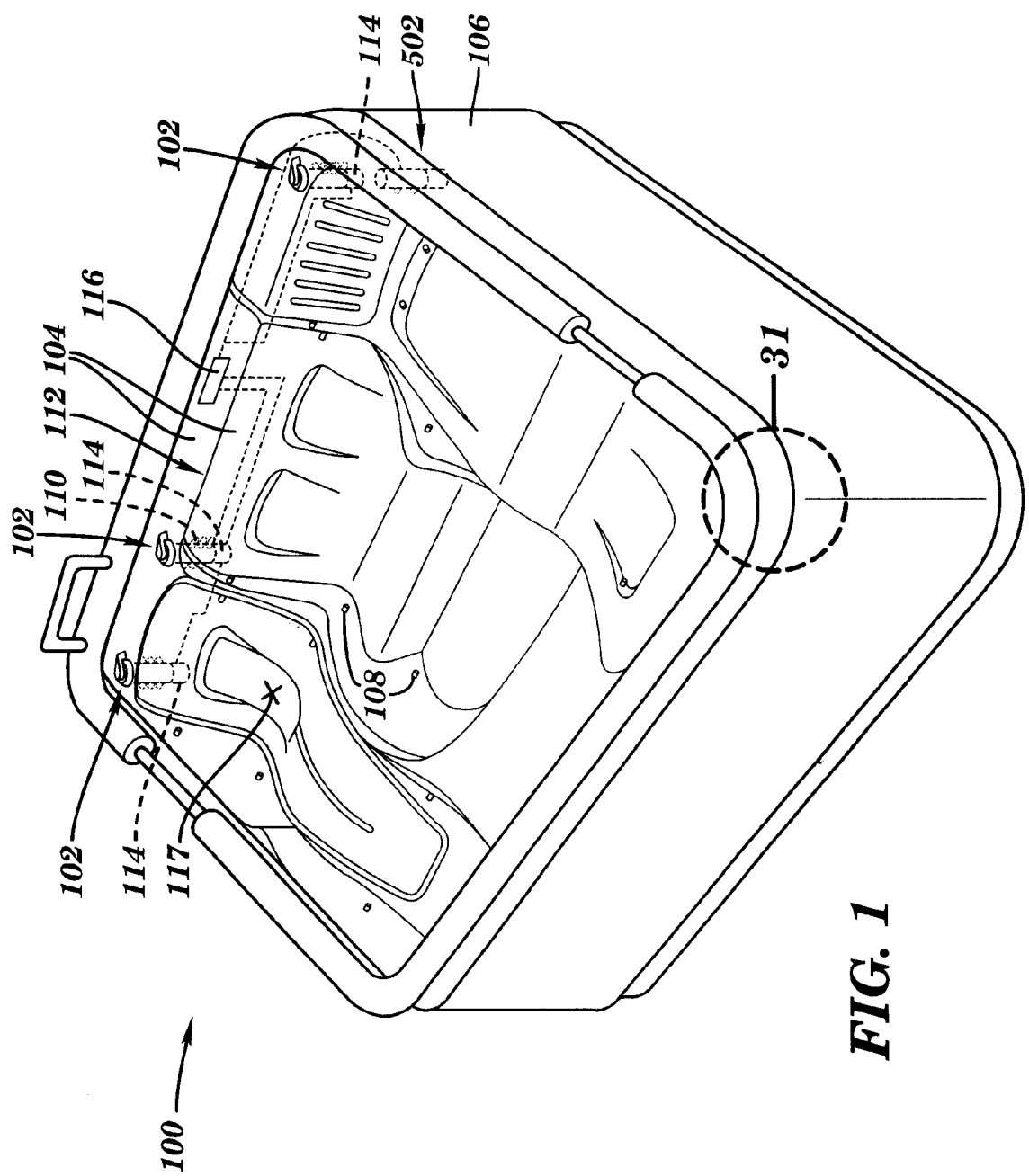
FIG. 1 is a partial, perspective view of one example of a system including exemplary flow control devices and ports located on a surface of one example of a tub, illustrating in phantom exemplary orientations for outlets of the flow control devices, and also illustrating in phantom motors of the flow control devices.
Figure 2:
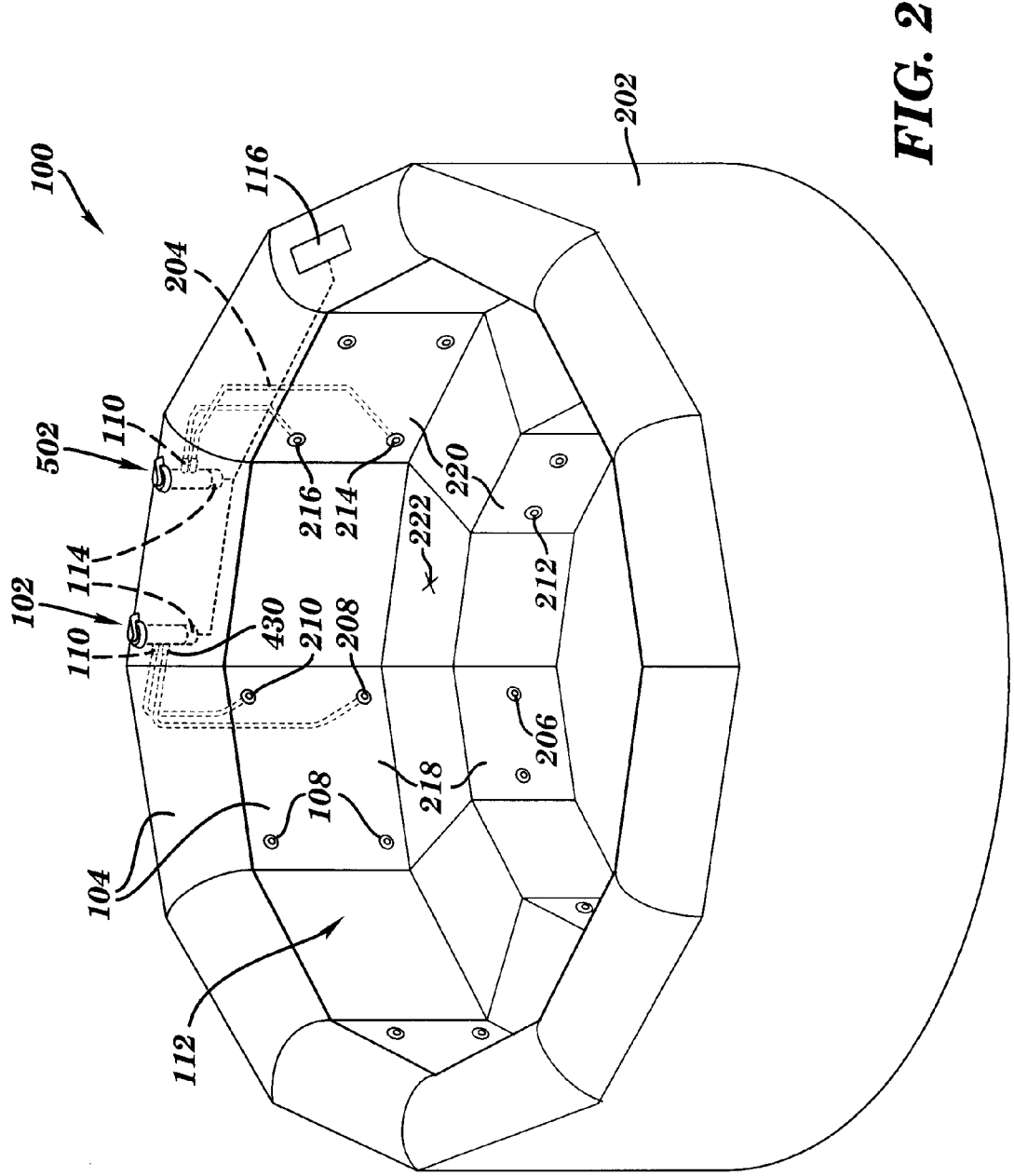
FIG. 2 is a partial, perspective view of an illustrative system including an example of two flow control devices and ports located on a surface of one example of a spa, illustrating in phantom one example of fluid communication on a one-to-one basis from outlets of the flow control device to a plurality of the ports, and also illustrating in phantom motors of the flow control devices.
Figure 3:
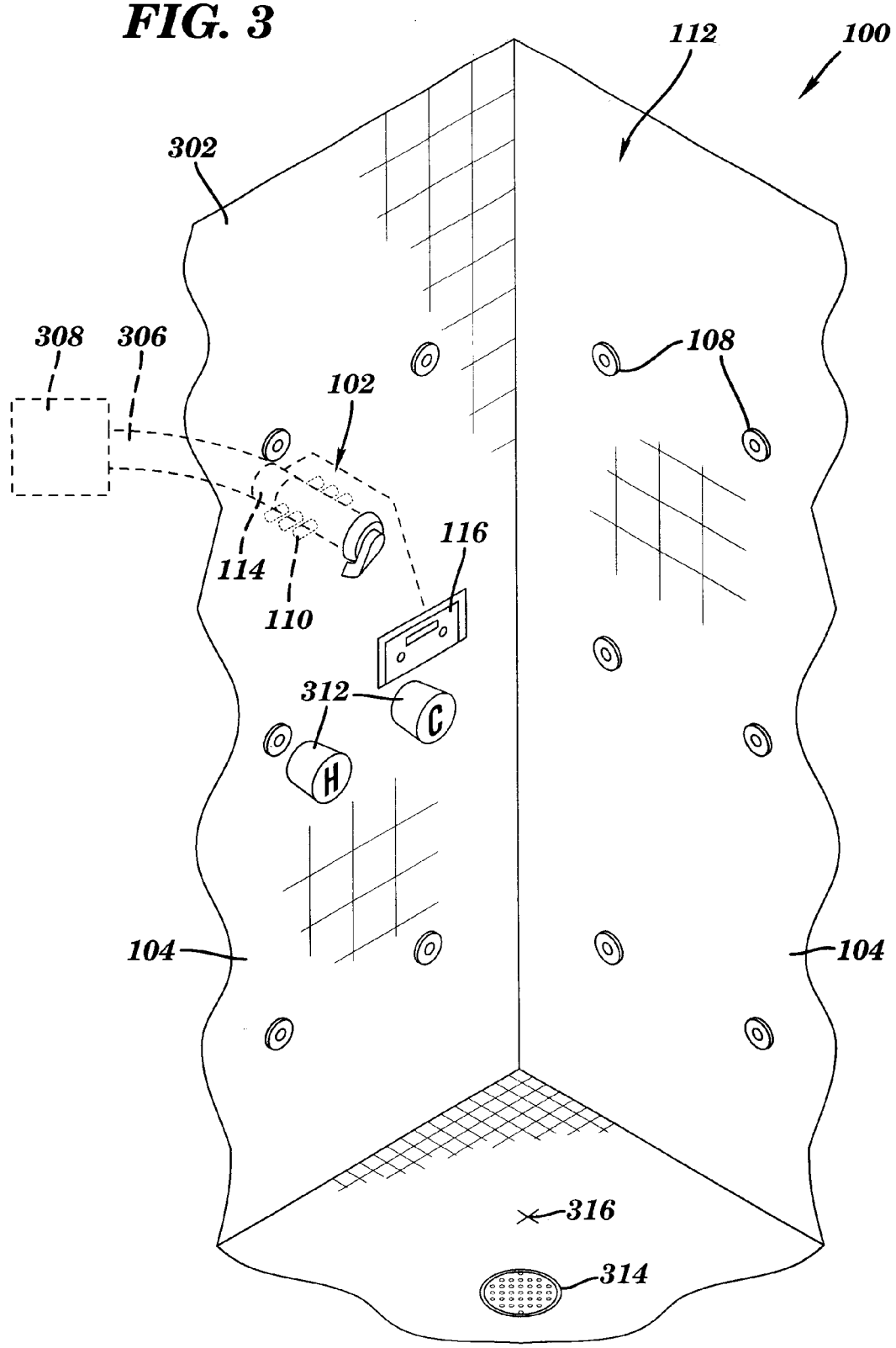
FIG. 3 is a partial, perspective, cutaway view of an exemplary system including one example of a flow control device and ports located on a surface of one example of a shower, illustrating in phantom an exemplary orientation for outlets of the flow control device, further illustrating in phantom one example of a water source in communication with the flow control device and also illustrating in phantom a motor of the flow control device.

Referring to FIGS. 1–3, system 100 may include one or more instances of flow control device 102 located on or beneath surface 104 of tub 106 (FIG. 1), spa 202 (FIG. 2), or shower 302 (FIG. 3). The tub, spa or shower may include interior 112. The interior may receive, hold, circulate and/or drain water and/or water-air froth. The surface may include curves, contours and/or planes. For example, the surface may be configured to provide comfortable, therapeutic and/or enjoyable seating, standing, reclining, positioning and/or fluid flow for one or more users 304 (FIG. 3) who may be located in the interior of the tub, spa or shower, as described herein.

Referring further to FIGS. 1–3, system 100 may include a plurality of ports 108. The ports may be located on surface 104 of the tub, spa or shower. In addition, the ports may be configured to transmit water to interior 112. In one example, one or more of the ports may comprise a nozzle. The ports may be in fluid communication with a plurality of connectors 204 (FIG. 2). The connectors may provide fluid communication between the ports and a plurality of outlets 110 of flow control device 102. For instance, the connectors may comprise a number of tubes attached and/or fastened to the outlets and the ports. Water may be transmitted by the connectors from the outlets to the ports. In one example, a conductor 306 (FIG. 3) may transmit water to the flow control device, for transmission from the outlets through the connectors to the ports. The conductor may receive water from water source 308 (FIG. 3). For instance, the conductor may comprise a tube coupled with the water source. The water source may comprise a water pump attached and/or fastened to the conductor for transmitting pressurized water therethrough. In addition, the outlets may be configured to ease and/or facilitate fastening, coupling, unfastening, decoupling, re-fastening and/or re-coupling thereof with the conductors. For instance, referring to FIG. 1, sets of the outlets may be directed in generally orthogonal directions (e.g., generally away from the interior of the tub) when the flow control device is located at a corner of the tub, and sets of the outlets may be directed in generally opposite directions (e.g., generally in parallel with a local surface) when the flow control device is located between corners of the tub.

Again referring to FIGS. 1–3, flow control device 102 may include a controller 116 for controlling a motor 114 which may move a first pipe relative to a second pipe or alternatively may move the second pipe relative to the first pipe. Controller 116 or a display for controller 116 may be located on surface 104, while motor 114 may be located on or beneath surface 104. Programming controller 116 to control motor 114 may allow selection among ports 108 for water delivery to interior 112 of the tub, spa or shower. In addition, one or more knobs 312 may be located on surface 104 of the tub, spa or shower. For example, the user may manually turn the one or more knobs to adjust the temperature of the water delivered through the flow control device to the ports and the interior of the tub, spa or shower. For instance, an exit 314 may be located on the surface of the tub, spa or shower. The exit may allow water to be removed, drained, and/or expelled from the interior of the tub, spa or shower. The selection of the ports for conduction of the water may be controlled by the user programming controller 116 to control motor 114 of flow control device 102, as described herein.

Referring further to FIGS. 1–3, ports 108 may be cooperatively and/or strategically arranged on surface 104 of the tub, spa or shower. The ports may have water conducted (e.g., distributed) therethrough as individual ones and/or in groups, sets, or subsets. In one example, a particular port 108 may be in fluid communication with a certain outlet 110 on a one-to-one basis. In another example, a particular port 108 may be in fluid communication with multiple outlets 110 on a one-to-many basis. In yet another example, multiple ports 108 may be in fluid communication with a certain outlet 110 on a many-to-one basis. In a further example, multiple ports 108 may be in fluid communication with multiple outlets 110 on a many-to-many basis.

Again referring to FIGS. 1–3, ports 108 may be located, for instance, on different parts of surface 104 about an intended location for user 304 (FIG. 3). For instance, referring to FIG. 2, pairs of ports 108 may be located approximately about the chest, the lower back, and the ankles of user 304 intended to be located (e.g., seated) approximately at exemplary location 222 on the surface of spa 202. As another example, referring to FIG. 1, pairs of ports 108 may be located approximately about the neck, the hips, and the feet of user 304 intended to be located (e.g., reclined) approximately at exemplary location 117 on the surface of tub 106. For example, referring to FIG. 3, pairs of ports 108 may be located approximately about the head, the waist, and the calves of user 304 intended to be located (e.g., standing) approximately at exemplary location 316 on the surface of shower 302. With such a configuration, a single user by programming controller 116 can select whether the flow from one or more flow control devices will flow from the sets of nozzles about the head, or about the waist, or about the lower legs, or about all these locations. Thus, by programming the controller, the user selectively controls the flow to different parts of his or her body.

For explanatory purposes, an illustrative description of exemplary water flow through ports 108 to interior 112 as selected by programming of controller 116 of flow control device 102 by user 304, is presented with reference to FIGS. 1–3.

Referring to FIG. 1, the user at location 117 may program the controller to control the motor to turn the first pipe or the second pipe to a first position which causes flow of water from the ports to both hips of the user. The user may program the controller to control the motor to turn the first pipe or the second pipe to a second position which causes flow of water to both feet and both hips of the user. Through the use of addition flow control devices, water flow might be selectively provided to other parts of the body, for example, the neck of the user.

Programming of the controller may also allow the preselection of flow patterns among the positions of the first or the second pipe described above. For example, the controller might be programmed to cause water flow to alternate at specified intervals of time between the first and second positions described above causing water flow to alternate between a user's feet and hips. Alternatively, through the use of a second flow control device, the controller might be programmed to cause water flow at specified intervals of time between one side of a user's neck and one foot or it may be programed to allow flow to alternate between one foot, one hip, and one side of a neck. Thus, the controller might allow a user to take advantage of all or some of the ports at timing preferable to him through programming the controller to move the first or second pipe of a plurality of flow control devices among a plurality of positions. The number of flow patterns can be varied by either changing the position of the first or the second pipe, or the time or cycle which the first pipe rotates relative to the second pipe of each flow control device. Thus, by varying the cycle time, the number of flow patterns is virtually unlimited.

Referring to FIG. 2, the user at location 222 may program the controller to control the motor of the first flow control device to turn the first pipe or the second pipe to a first position which causes flow of water from the ports to both Achilles tendons of the user. The user may program the controller to control the motor to turn the first pipe or the second pipe to a second position which causes flow of water from the ports to both shoulders of the user. The user may program the controller to control the motor to turn the first pipe or the second pipe to a third position which causes flow of water from the ports to both shoulders and both Achilles tendons. As will be evident to those skilled in the art, further flow control devices may be provided to control flows of water from ports to other parts of the body at selected intervals of time. For example, flow of water might be provided to the waist area of the user.

Figure 5:
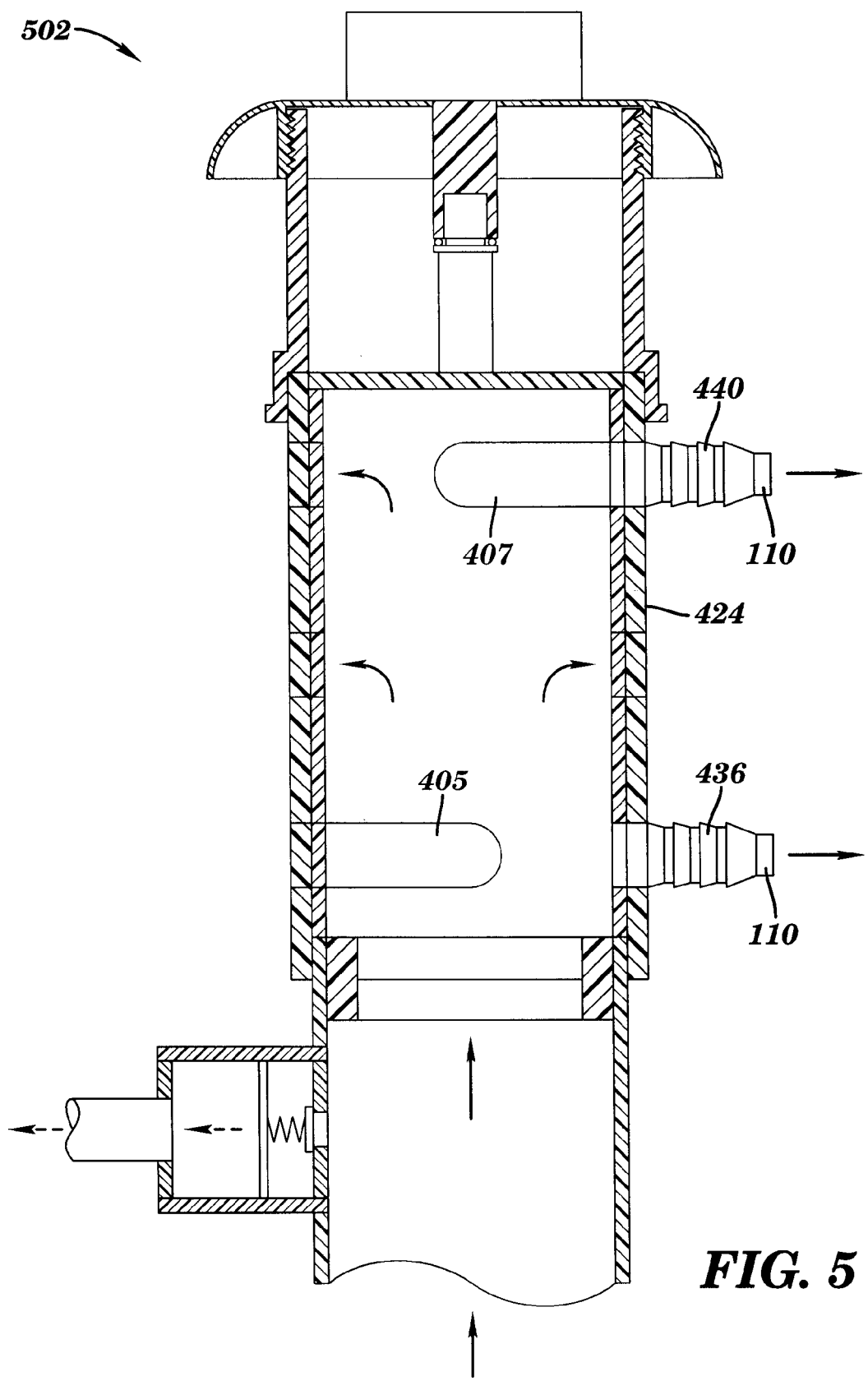
FIG. 5 is a cutaway, sectional, partial, elevation view of another example of a flow control device of a system as in FIGS. 1–3, illustrating one example of water flow through the device, further illustrating a set of outlets of an outer pipe of the flow control device, and also illustrating a relief valve of the flow control device.

Programming of the controller may also allow the preselection of flow patterns among the positions of the first or the second pipes described above. For example, a user might program the controller to alternate at specified intervals of time between the first and second positions described above causing water flow to alternate between a user's Achilles tendons and shoulders (e.g. ports 206, 212, 210, and 216). Also, through the use of a second flow control device 502 (FIGS. 1 and 5), the controller might be programmed to alternate at specified intervals of time between various other positions of first flow control device 102 second flow control device 502 to cause water flow to a user's waist, Achilles tendons, and shoulders (e.g. ports 208, 214, 206, 212, 210, and 216). A user might also program the controller to alternate water flow between part of the waist, one Achilles tendon, and one shoulder (e.g. ports 214, 212, and 210). Through programming of the controller by a user, other patterns of preselection are possible by combining and isolating particular ports through the selection of various positions of several flow control devices at specified intervals of time.

Referring to FIG. 3, the user at location 316 may program the controller to control the motor of first flow control device 102 to turn the first pipe or the second pipe to a first position which causes flow of water from the ports to both shins and calves of the user. The user may program the controller to control the motor to turn the first pipe or the second pipe to a second position which causes flow of water from the ports to multiple sides of the lower back and abdomen of the user. The user may program the controller to control the motor to turn the first pipe or the second pipe to a third position which causes flow of water to the parts of both the first and second positions. The user may program the controller to control the motor of second flow control device 502 to cause water flow to other areas of the body, for example, the shins, calves, face, forehead, ears, hair, neck, and shoulders of the user.

Programming of the controller may also allow the preselection of flow patterns among the positions of first flow control device 102 described. For example, the controller might be programmed to cause water flow to alternate at specified intervals of time between the first and second positions described above causing water flow to alternate between a user's shins and calves and multiple sides of the user's lower back and abdomen. The user might program the controller to alternate between the first, second, and third positions of the first or second pipe causing water flow to alternate between a user's shins and calves and multiple sides of the user's lower back and abdomen and water flow to all of these locations simultaneously. Alternatively, the controller might be programmed to control the motor of first flow control device 102 and a motor of second flow control device 502 to cause water flow at specified intervals of time, for example, between one of a user's shins/calves, one side of the lower back/abdomen, and one side of the face and shoulder. Thus, a user might program the controller to preselect other flow patterns at preferred intervals of time by combining and isolating particular ports through the movement of the first and second pipes of one or more flow control devices among a plurality of positions.

Turning to FIGS. 4, 6–8 and 26–27, flow control device 102 may include outer pipe 402, inner pipe 404, motor 114, and controller 116. The outer pipe may rotatably receive the inner pipe. For example, the outer pipe may comprise a hollow cylindrical sleeve having an inner diameter sized to snugly and/or slidably engage a slightly smaller outer diameter of another hollow cylindrical sleeve comprising the inner pipe. The inner pipe may be connected with the motor. In addition, the inner pipe may include a plurality of elongated inlets 406. The inner pipe may be configured for selective pivoting through movement by the motor to control alignment of elongated inlets 406 with outlets 110 of the outer pipe. For example, the user, by programing the controller to control the motor to turn the outer pipe 402 or the inner pipe 404, may selectively align individual ones, sets, or subsets of the elongated inlets with the outlets. Further, the movement of the outer pipe 402 or the inner pipe 404 by the motor may serve to selectively block individual ones, sets, or subsets of the outlets with one or more solid portions 425 of the inner pipe. Exemplary description of selective alignment of the inlets and solid portions with outlets by movement of the outer pipe 402 or the inner pipe 404, is presented herein.

Figure 4:
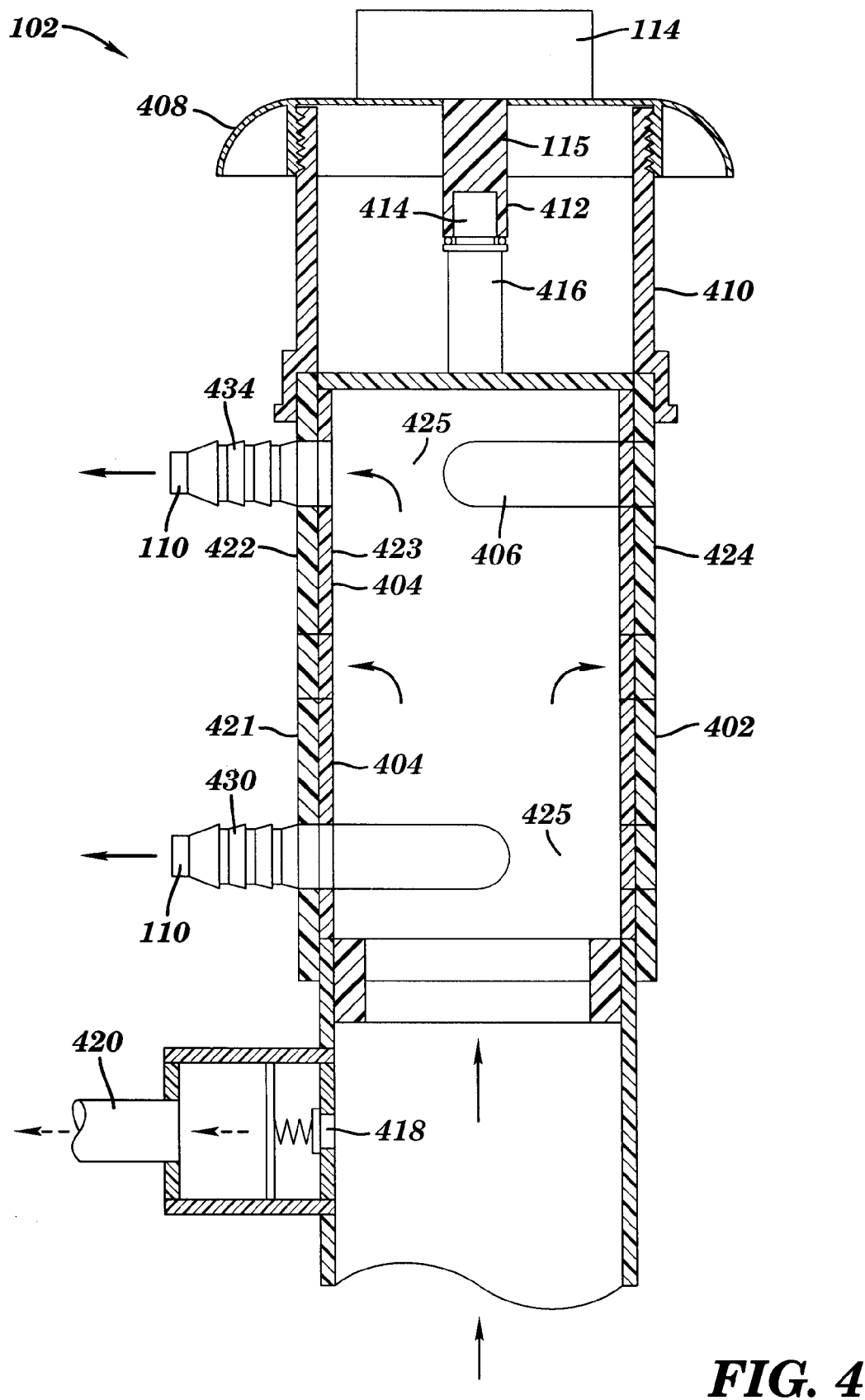
FIG. 4 is a cutaway, sectional, partial, elevation view of one example of a flow control device of a system as in FIGS. 1–3, illustrating one example of water flow through the device, further illustrating one set of outlets of an outer pipe of the flow control device, and also illustrating a relief valve of the flow control device.
Figure 6:
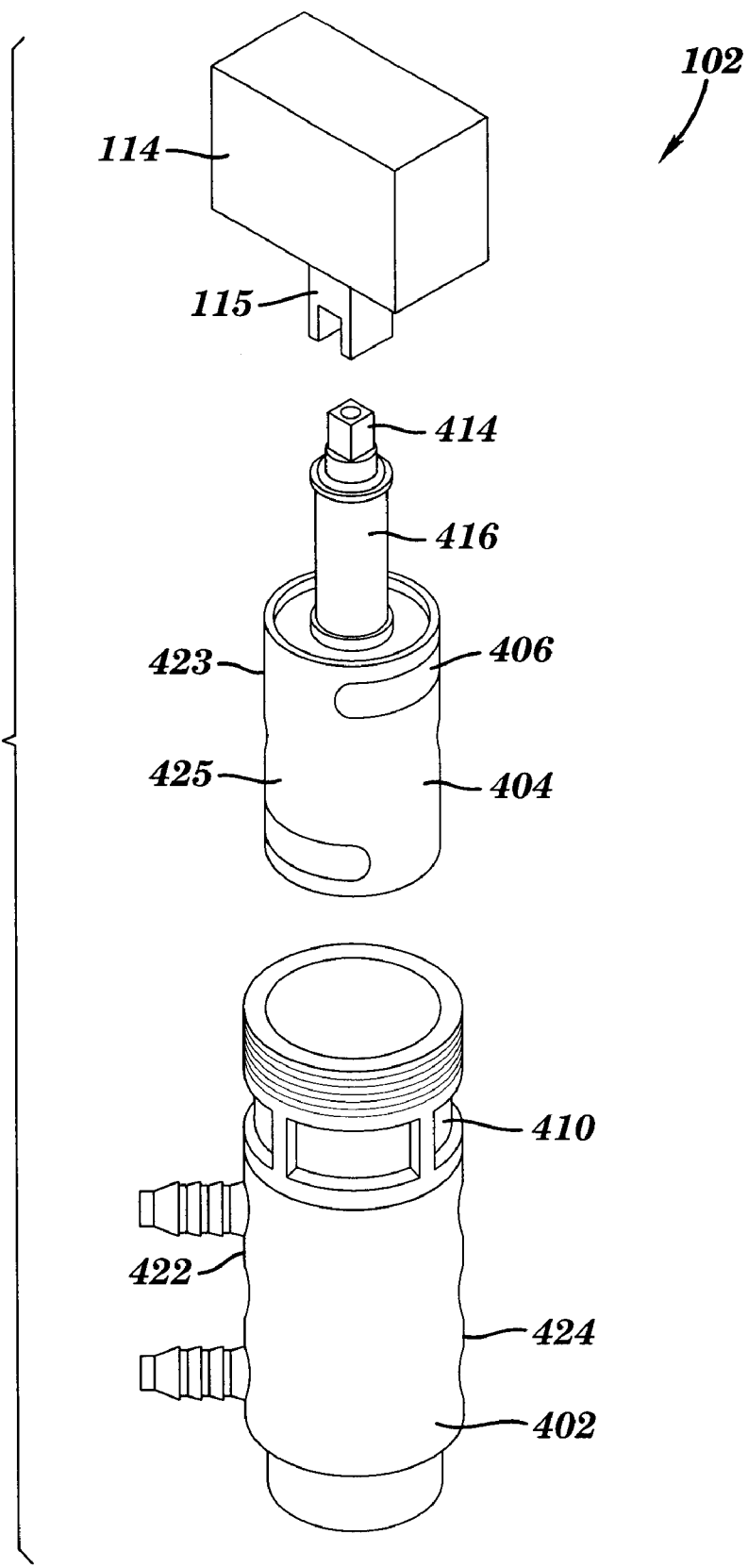
FIG. 6 is a partial, cutaway, exploded, perspective view of the flow control device of FIG. 4.

Referring to FIGS. 4 and 6, inlets 406 and outlets 110 may be sized for cooperative communication of water therethrough. In one example, the inlets and the outlets may be comparable in size. In another example, a number of the inlets may be elongated or larger than the outlets, and oriented to circumferentially overlap one another and thus span more than one circumferential portion of inner pipe 404. This allows an inlet to remain in fluid communication with an outlet and an outlet to remain in fluid communication with a port when inner pipe 404 is moved from one position to another position relative to the outlets of outer pipe 402. By allowing at least one inlet, outlet and port to remain in fluid communication, a build up of pressure or "hammering" can be reduced or eliminated.

Sudden increases in water and/or air pressure may occur when the position of inner pipe 404 is moved relative to outer pipe 402. The pressure changes result from inlets and outlets alternating among fluid communication with and non-communication with each other and with the ports, as is known by those skilled in the art. Any excess water/air pressure generated as a result of a change in the position of inner pipe 404 may be relieved to the interior of the spa through the fluid communication of the inlet(s), outlet(s), and port(s) which remain in fluid communication with one another through more than one position of inner pipe 404 due to the elongated nature of the inlets.

For example, a first position of an inner pipe relative to an outer pipe might cause fluid communication between two elongated inlets, two outlets, and two ports, and a second position might cause fluid communication between only one elongated inlet, one outlet, and one port. In the case of moving between the first position and the second position, any excess water, air, and/or energy of the pressure difference generated in the transition from fluid communication of two sets of elongated inlets, outlets and ports to one set thereof, might be discharged to the interior of the spa through the inlet, outlet, and port remaining in fluid communication with one another. Thus, a need for a pressure relief valve may be reduced or eliminated through the utilization of the elongated inlets which span more than one position of inner pipe 404. In further examples, the inlets and/or the outlets may comprise any number of shapes, locations, and/or patterns.

Referring to FIGS. 1–6, flow control device 102 may be located on surface 104 by attaching or fastening a portion of the flow control device to a wall of the tub, spa or shower. In one example, the wall may comprise surface 104 of the tub, spa or shower. The wall may include a first side comprising a surface 104 facing in a direction toward interior 112, and a second side (e.g., the backside of the wall) facing in an opposite direction (e.g., away from the interior). For instance, bolts, nuts, screws, glue, gaskets and/or sealant may be employed to secure the flow control device to the tub, spa or shower. For example, the motor of the flow control device may be located on or beneath the surface 104 to allow pivoting of the outer pipe 402 or the inner pipe 404 by the motor through the programming of the controller by user 304 with the user located in the interior of the tub, spa or shower. Controller 116 or a display for controller 116, may be located on the surface 104.

Referring to FIGS. 4 and 6, neck 410 of flow control device 102 may be employed to support motor 114. The neck may extend through an aperture in a wall of the tub, spa or shower. The neck may be supported with outer pipe 402, for example, located behind the wall. In addition, the neck may be connected with cap 408 of the flow control device. For instance, the neck and the cap may be connected by mating screw threads. Further, the cap may include an opening through which may extend shaft 412 of the motor. The shaft 115 of the motor may receive head 414 of interconnector 416 of the flow control device. For example, the shaft 115 may include a recess or slot for receiving the head of the interconnector. The recess and the head may be sized and/or shaped cooperatively. For instance, the recess may include surfaces for static engagement with the head. The interconnector may be supported and/or connected with inner pipe 404. Turning of the shaft by the motor controlled by the controller programmed by user 304 may advantageously transmit force applied by the shaft to the interconnector to effect pivoting of the inner pipe. For instance, the shaft may cause directly corresponding pivoting of the inner pipe. Referring to FIGS. 4–8, the shaft may be pivoted 360 degrees to effect selective full and/or partial alignments and/or non-alignments of inlets 406 of the inner pipe with outlets 110 of outer pipe.

In another example, controller 116 or a display for controller 116 may have markings and/or indications for a number of occurrences of the full and/or partial alignments and/or non-alignments between the inlets and the outlets. Further illustrative description of turning of the shaft to effect pivoting of the inner pipe, is presented herein.

Referring to FIG. 4, flow control device 102 may include relief valve 418. The relief valve may be in communication with inner pipe 404. For example, the relief valve may provide relief of excess water pressure in the flow control device. For instance, the relief valve may be configured to provide pressure relief approximately at a particular level 0f fluid pressure. Referring to FIGS. 1–4, the relief valve may be in fluid communication with a port 108 located on surface 104 of the tub, spa or shower. A conduit 120 (FIG. 4) may provide communication between the relief valve and the port. In one example, water source 308 (FIG. 3) may comprise a pump providing a pressure head of approximately 26 psi., and the relief valve may be triggered at approximately 14 p.s.i. For example, user 304 may program die controller 116 to select all outlets 110 for water flow to interior 112 of the tub, spa or shower, nod then the user may program the controller 116 to select some of tile outlets for water flow to the interior of the tub, spa or shower. The difference in water pressure resulting from transmission through all the outlets versus some of the outlets may be accommodated by the pressure relief valve. For instance, the excess water and/or energy of the pressure difference may be relieved and/or employed by transmission of the excess water through the relief valve to one or more ports 108 in the tub, spa or shower. Also, if more than one flow control device are connected together either in series or in parallel flow relationship, the use of a relief valve on each flow control device will ensure that no excess pressure is exerted within ally of the flow control devices. Such excess pressure could conceivably occur when less than a certain number of how control devices are in the "off" position.

Again referring to FIGS. 4 and 6, a number of portions of flow control device 102 may comprise a material such as plastic and/or ABS plastic. For instance, such a material may be formed by a technique such as molding and/or injection molding. In one example, a seal and/or fluid-tight seal may be provided between portions of flow control device 102. For instance, such a seal may comprise glue and/or gasketing material.

For illustrative purposes, detailed examples are presented herein.

Referring to FIGS. 4–9 and 26–27, flow control device 102 may include a number of outlets or sets of outlets 110 arranged in one or more circumferential portions 421 of outer pipe 402. The outlets or sets of outlets may be cooperatively and/or strategically arranged. Referring to FIGS. 4 and 6, a set of outlets 110 located in first circumferential portion 422 of outer pipe 402 may comprise two outlets. The set of outlets may comprise a proximal outlet 430 and a distal outlet 434. In another example, referring to FIG. 26, a first and second set of outlets may be generally directed in orthogonal directions. In yet another example, referring to FIG. 27, a third set of outlets may be located in a third circumferential portion 920 of the outer pipe. For instance, the set of outlets of the outer pipe may be generally directed in directions having an obtuse angle (e.g., approximately 120 degrees) therebetween.

Referring to FIGS. 1–6, a first outlet of the set of outlets 110 may be in communication with a first set of ports 108. Also, a second outlet of a second flow control device may be in communication with a second set of ports. The sets of ports might be located in different parts of surface 104. The communication between the outlets and the ports may comprise a number of set-to-set (e.g., many-to-many), one-to-one, many-to-one, and/or one-to-many bases.

Referring to FIGS. 2 and 8–21, a proximal outlet 430 may be in fluid communication with a proximal port 208, and a distal outlet 434 may be in fluid communication with a distal port 210. For instance, proximal port 208, and distal port 210 may comprise a first set of ports. The first set of ports may be located in first part 218 of the surface 104. So, the first set of outlets may be in fluid communication with the first set of ports on a one-to-one basis. In addition, a proximal outlet 436 of a second flow control device 502 may be in fluid communication with proximal port 214, and a distal outlet 440 may be in fluid communication with distal port 216. So, the second set of outlets may be in fluid communication, on a one-to-one basis, with a second set of ports comprising the proximal port 214, and the distal port 216. The second set of ports may be located in second part 220 of the surface 104. The first and second parts of the surface may be located about an intended location for user 304 (FIG. 3) in interior 112 of the tub, spa or shower. For example, the user may be intended to be located approximately at a location such as location 117 (FIG. 1) in the tub, location 222 (FIG. 2) in the spa, and/or location 316 (FIG. 3) in the shower.

Referring to FIGS. 1–9, inner pipe 404 may include a number of circumferential portions 423 comprising inlets 406 and solid portions 425 arranged for selectable and/or controllable water transmission from water source 308 to individual ones, subsets, and/or sets of outlets 110 and ports 108. Selective alignment of the circumferential portions of the inner pipe with the outlets, may be effected through the programming of the controller 116 by user 304 causing motor 114 to move the outer pipe 402 or the inner pipe 404. Similarly, a second inner pipe may include a number of circumferential portions comprising inlets 407 and 405, and solid portions 409.

Figure 31:
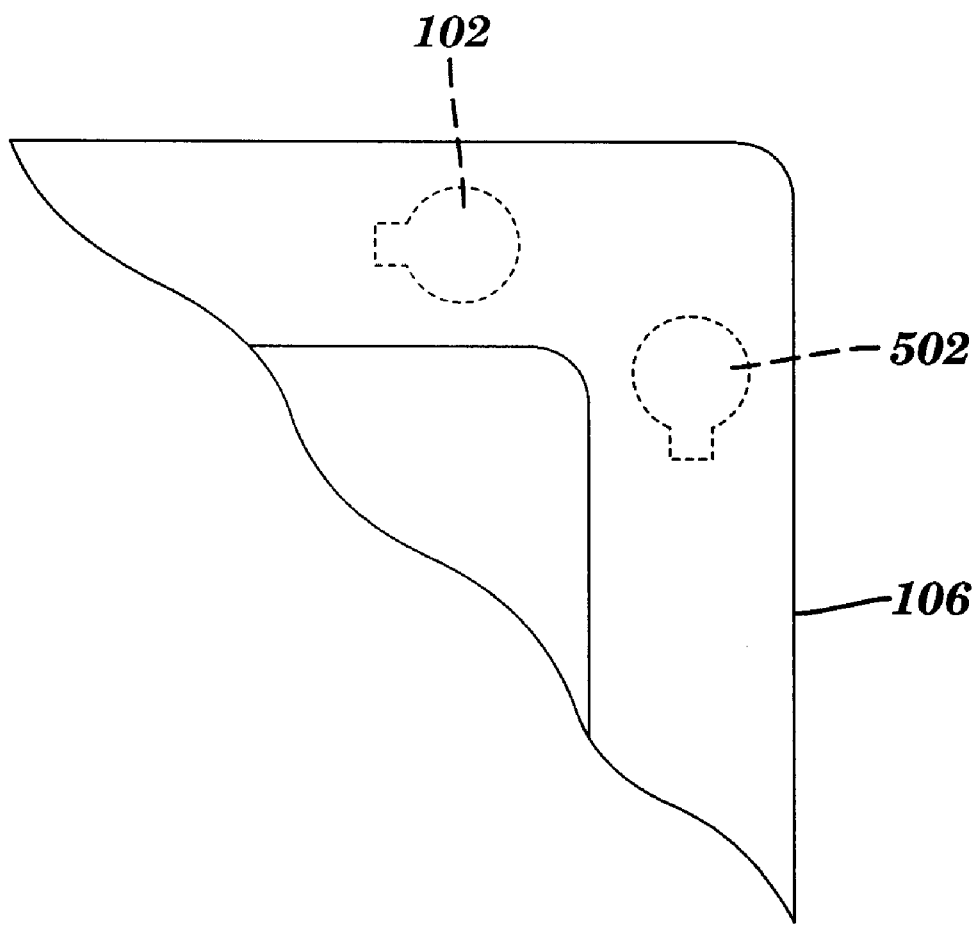
FIG. 31 is a top view of a portion of FIG. 1 illustrating in phantom exemplary orientations for flow control devices.

In one example, referring to FIG. 8, inner pipe 404 may comprise a plurality of circumferential portions including elongated inlets and solid portions as follows. A circumferential portion 702 of the inner pipe may comprise a proximal inlet 704, and a distal solid portion 708. A circumferential portion 710 of the inner pipe may comprise a proximal inlet portion 704, and a distal inlet 716. A circumferential portion 718 of the inner pipe may comprise a proximal solid portion 720, and a distal inlet 716. A circumferential portion 726 of the inner pipe may comprise a proximal inlet 704, and a distal inlet 716. Circumferential portions 702, 710, 718 and 726 may be about 90 degrees apart on inner pipe 404. A similar arrangement of circumferential portions having elongated inlets and solid portions of the second inner pipe of second flow control device 502 is depicted in FIG. 9. This arrangement allows flow control device 102 and second flow control device 502 to be placed in a corner of a spa or hot tub as shown in FIGS. 1, 2 and 31 such that their outlets are about perpendicular to each other.

Referring to FIGS. 8–11, a user may program the controller 116 to control the motor 114 to turn outer pipe 402 or inner pipe 404 of first flow control device 102 to a first position in which circumferential portion 702 of inner pipe 404 may be aligned with circumferential portion 422 of outer pipe 402. So, inlet 704 may be aligned with outlet 430 and solid portion 708 may be aligned with outlet 434. Therefore, water may flow through the inner pipe to port 208. A first position of a second flow control device 502 may further align a circumferential portion 734 of the second inner pipe with circumferential portion 424 of a second outer pipe. Thus, water may flow through the second inner pipe to port 214.

Referring to FIGS. 8, 9, 12 and 13, a user may program the controller 116 to control the motor 114 to turn outer pipe 402 or inner pipe 404 of the first flow control device 102 to a second position in which circumferential portion 710 of inner pipe 404 may be aligned with circumferential portion 422 of outer pipe 402. So, inlet 716 may be aligned with outlet 434. In addition, inlet 704 remains aligned with outlet 430. Therefore, water may flow through the inner pipe to ports 208 and 210. A second position of second flow control device 502 may further align a circumferential portion 736 of the second inner pipe with circumferential portion 424 of the second outer pipe. Thus, water may flow through the second inner pipe to ports 216 and 214.

Referring to FIGS. 8, 9, 14 and 15, a user may program controller 116 to control motor 114 to turn outer pipe 402 or inner pipe 404 of first flow control device 102 to a third position in which circumferential portion 718 of inner pipe 404 may be aligned with circumferential portion 422 of outer pipe 402. So, inlet 716 may remain aligned with outlet 434. In addition, solid portion 720 may be aligned with outlet 430. Therefore, water may flow through the inner pipe to port 210. Also, water may be blocked from flowing through the inner pipe to port 208. A third position of second flow control device 502 may further align a circumferential portion 738 of the second inner pipe with circumferential portion 424 of the second outer pipe. Thus, water may flow through the second inner pipe to port 216, and water may be blocked from flowing through the second inner pipe to port 214.

Referring to FIGS. 8, 9, 16 and 17, a user may program the controller 116 to control the motor 114 to turn outer pipe 402 or inner pipe 404 of first flow control device 102 to a fourth position in which circumferential portion 726 of inner pipe 404 may be aligned with circumferential portion 422 of outer pipe 402. So, inlet 704 may be aligned with outlet 430. In addition, inlet 716 may be aligned with outlet 434. Therefore, water may flow through the inner pipe to ports 208 and 210. The fourth position of second flow control device 502 may further align a circumferential portion 740 of the second inner pipe with circumferential portion 424 of the second outer pipe. Thus, water may flow through the second inner pipe to ports 214 and 216.

Referring to FIG. 4, 5, 18 and 19, in another example, a user may program the controller 116 to control the motor 114 to turn outer pipe 402 or inner pipe 404 of first control device 102 to a position in which a first circumferential portion of inner pipe 404 may be aligned with circumferential portion 422 of outer pipe 402. The first circumferential portion of the inner pipe may comprise inlet 716 of the inner pipe to be aligned with outlet 434 of the outer pipe. In addition, the first circumferential portion may comprise a solid portion of the inner pipe to be aligned with outlet 430 of the outer pipe. So, water may flow through the inner pipe to port 210. Also, water may be blocked from flowing through the inner pipe to port 208. The position may further include a second motor of second flow control device 502 aligning a second circumferential portion of the second inner pipe with circumferential portion 424 of the second outer pipe. The second circumferential portion of the second inner pipe may comprise an inlet 405 (FIG. 9) of the second inner pipe to be aligned with outlet 436 of the second outer pipe. In addition, the second circumferential portion may comprise a solid portion of the second inner pipe to be aligned with outlet 440 of the second outer pipe. Therefore, water may flow through the second inner pipe to port 214. For instance, a staggered and/or asymmetric flow situation may thus be achieved.

Referring to FIGS. 4, 5, 20 and 21, a user may program the controller 116 to control the motor 114 to turn said outer pipe 402 or said inner pipe 404 of first flow control device 102 to a position in which another circumferential portion of inner pipe 404 may be aligned with circumferential portion 422 of outer pipe 402. The first circumferential portion of the inner pipe may comprise inlets 704 of the inner pipe to be aligned with outlet 430 of the outer pipe. So, water may flow through the inner pipe to port 208. Also, water may be blocked from flowing through the inner pipe to port 210. The position may further include a second motor aligning a second circumferential portion of the second inner pipe of second flow control device 502 with circumferential portion 424 of the second outer pipe. The second circumferential portion of the inner pipe may comprise inlet 407 (FIG. 9) of the second inner pipe to be aligned with outlet 440 of the second outer pipe. In addition, the second circumferential portion may comprise a solid portion of the second inner pipe to be aligned with outlet 436 of the second outer pipe. Therefore, water may flow through the second inner pipe to port 216, and water may be blocked from flowing through the inner pipe to port 214. For instance, a reverse of the staggered effect of FIGS. 18 and 19 may thus be achieved.

Figure 22:
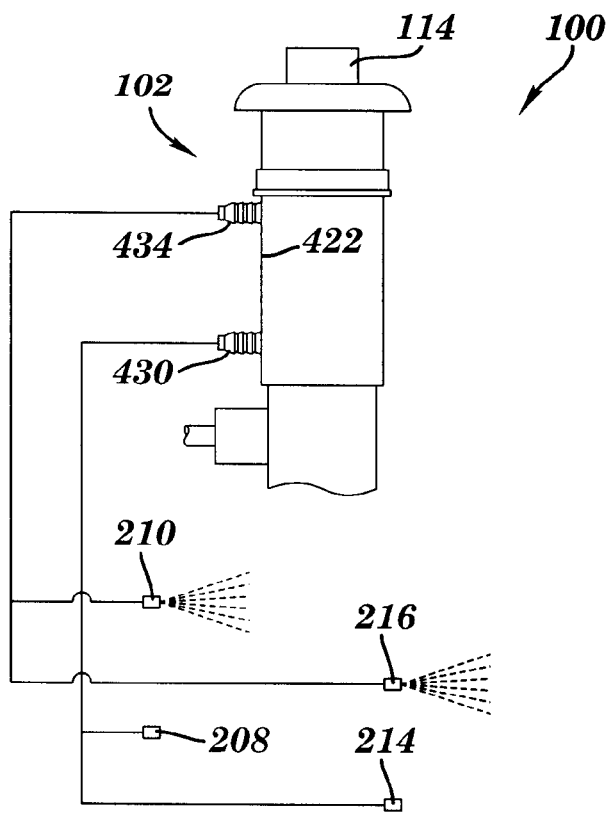
FIG. 22 is partial, cut away, schematic representation of one example of the system providing water flow from the flow control device of FIG. 8 to illustrate ports of the tub, spa or shower, representing one inlet of the inner pipe completely aligned with an outlet of the outer pipe.
Figure 23:
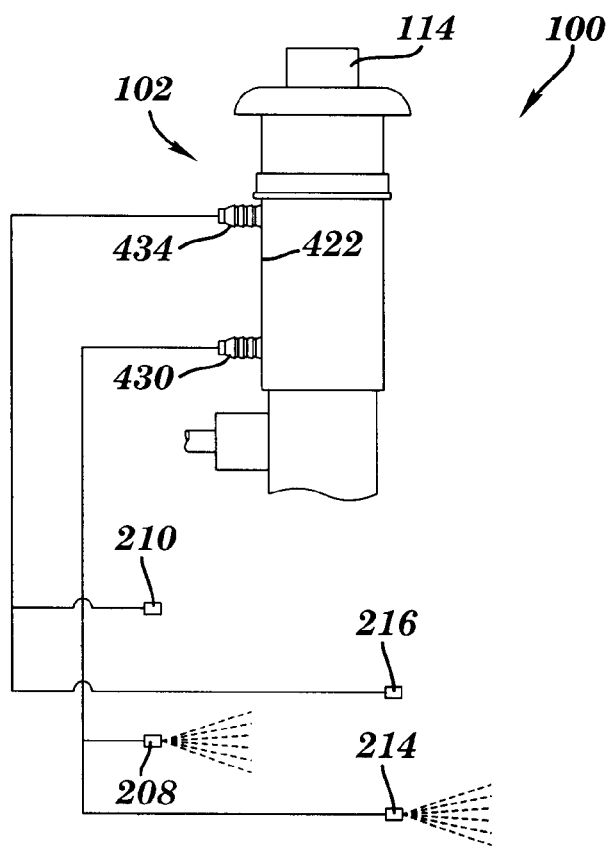
FIG. 23 is analogous to FIG. 22, and represents one outlet of the inner pipe aligned with the proximate outlet of the outer pipe.
Figure 24:
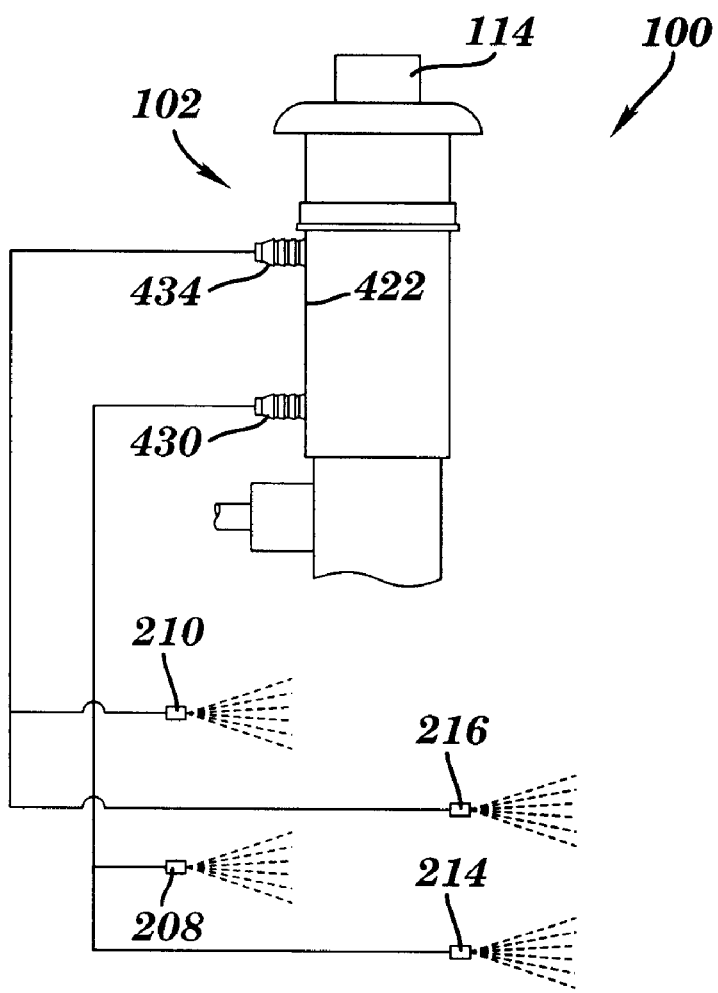
FIG. 24 is analogous to FIG. 22, and represents two inlets of the inner pipe aligned with the set of outlets of the outer pipe.

Referring to FIGS. 22–23, in another example, flow control device 102 may include outlet 434 in fluid communication with ports 210 and 216 while outlet 430 may be in fluid communication with ports 208 and 214. As will be evident to those skilled in the art, this arrangement would allow a user to select among these sets of ports such that ports 210 and 216 might be in fluid communication with a supply of water as illustrated in FIG. 22. Alternatively, ports 208 and 214 might be in fluid communication with outlet 430 and the source of water as illustrated in FIG. 23. Further, both sets of ports might be in fluid communication with both outlets and the supply of water as illustrated in FIG. 24. As will be also understood by those skilled in art, the user might control the controller to cause a selection among these sets of ports to cause a desirable effect. As will be further understood by those skilled in the art, this arrangement might be modified to further include a second flow control device connected to additional ports or to further include the outlets being connected to more than two ports.

Figure 8:
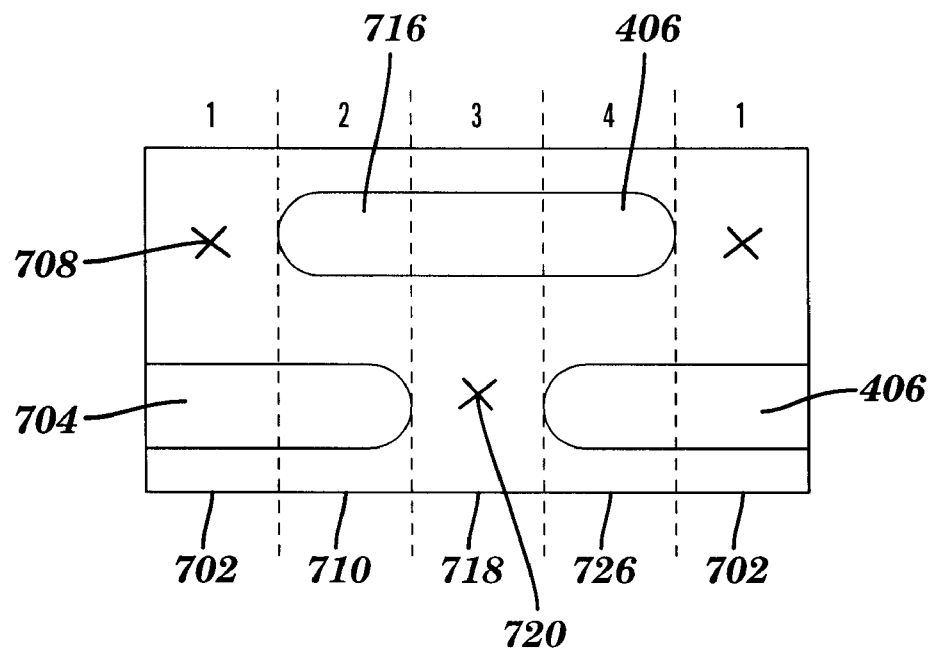
FIG. 8 is a mapped representation of exemplary sets of inlets located in circumferential portions of an inner pipe of the flow control device of FIG. 4.
Figure 29:
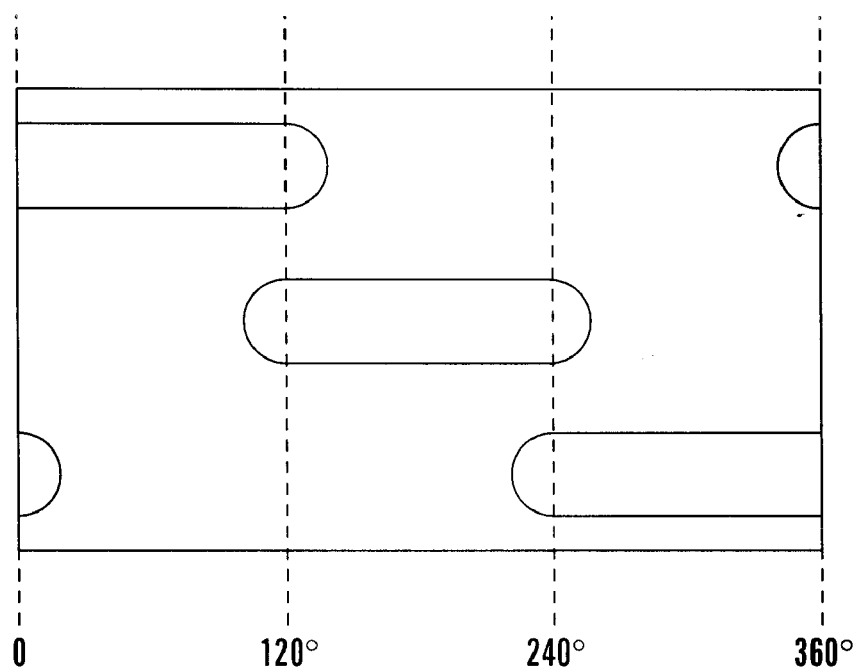
FIG. 29 is a mapped representation of exemplary sets of inlets located in circumferential portions of an inner pipe of the flow control device of FIG. 28.
Figure 9:
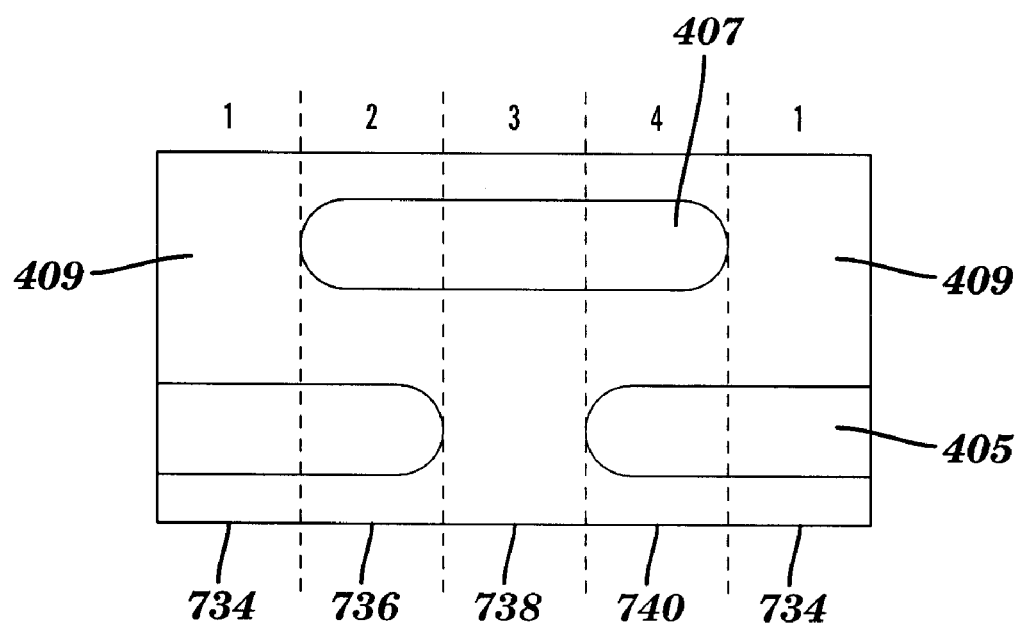
FIG. 9 is a mapped representation of exemplary sets of inlets located in circumferential portions of an inner pipe of the flow control device of FIG. 5.
Figure 10:
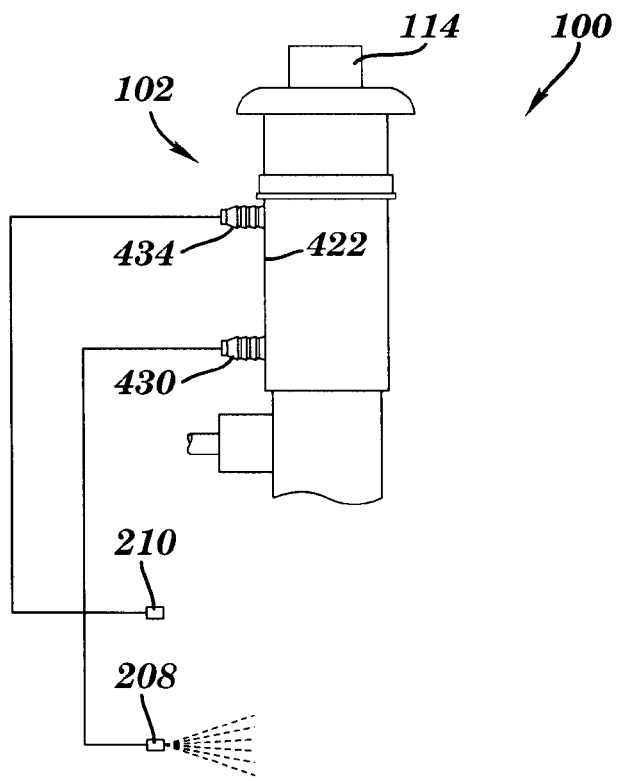
FIG. 10 is a partial, cutaway, schematic representation of one example of a system providing water flow from the flow control device of FIG. 8 to illustrative ports of the tub, spa or shower, representing one inlet of the inner pipe completely aligned with one outlet of the outer pipe.
Figure 12:
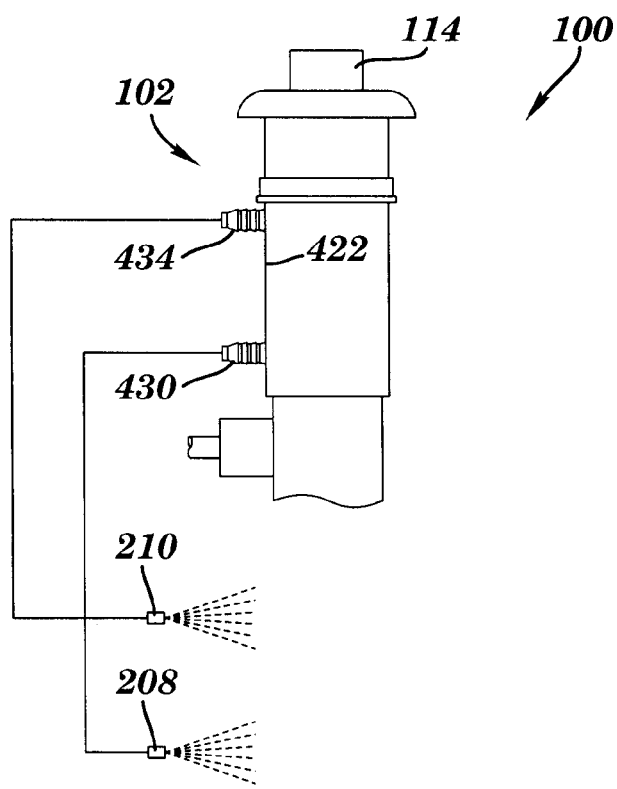
FIG. 12 is similar to FIG. 10, and represents two inlets of the inner pipe completely aligned with the two outlets of the outer pipe.
Figure 11:
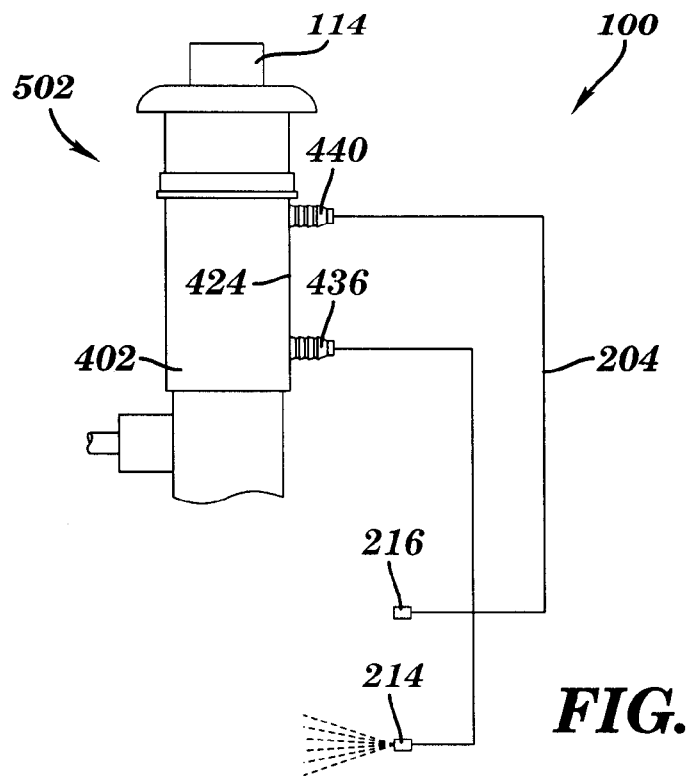
FIG. 11 is a mirror image of FIG. 10, and represents one in let of the inner pipe of the flow control device of FIG. 9 completely aligned with the one outlet of the set of outlets of the outer pipe.
Figure 13:
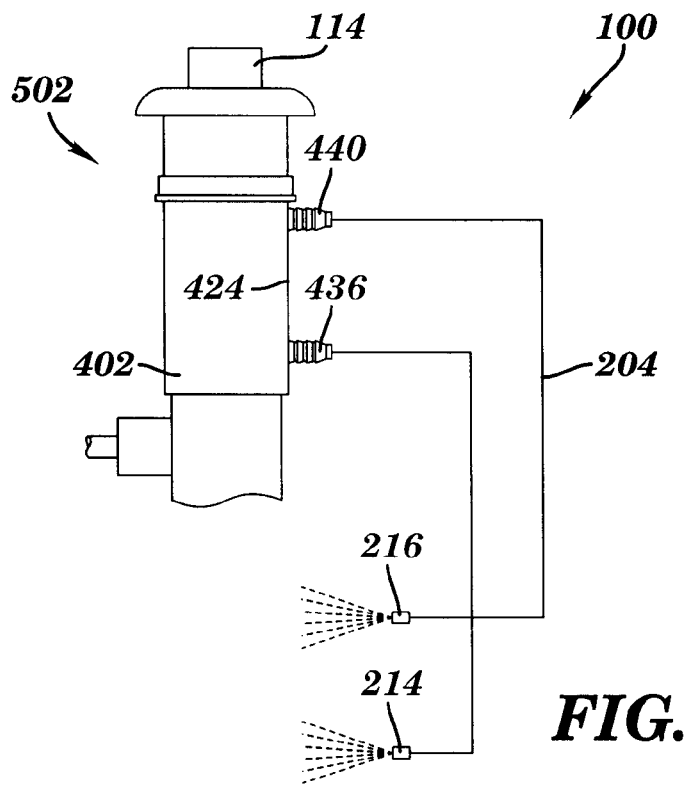
FIG. 13 is similar to FIG. 11, and represents two inlets of the inner pipe completely aligned with two outlets of the outer pipe.
Figure 14:
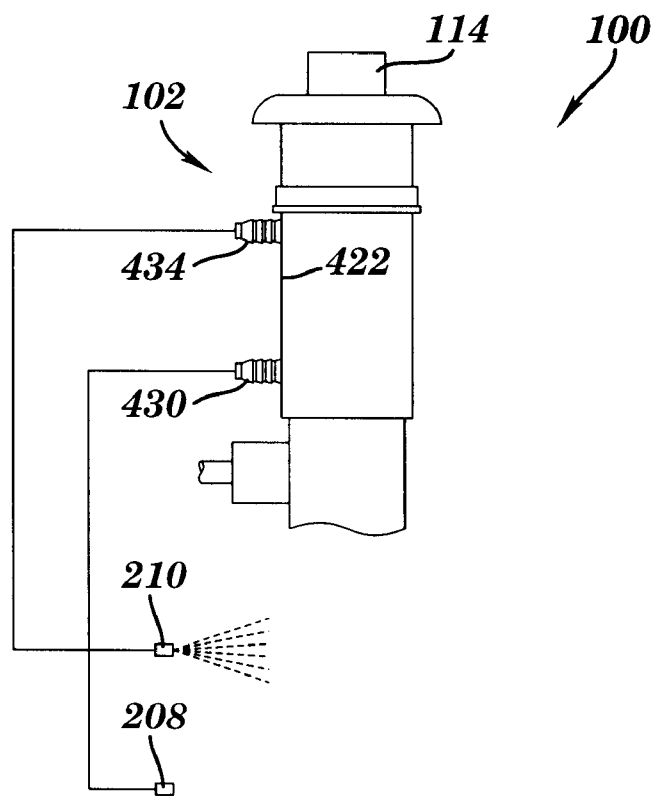
FIG. 14 is similar to FIG. 10, and represents one inlet of the inner pipe aligned with the distal outlet of the set of outlets of the outer pipe.
Figure 16:
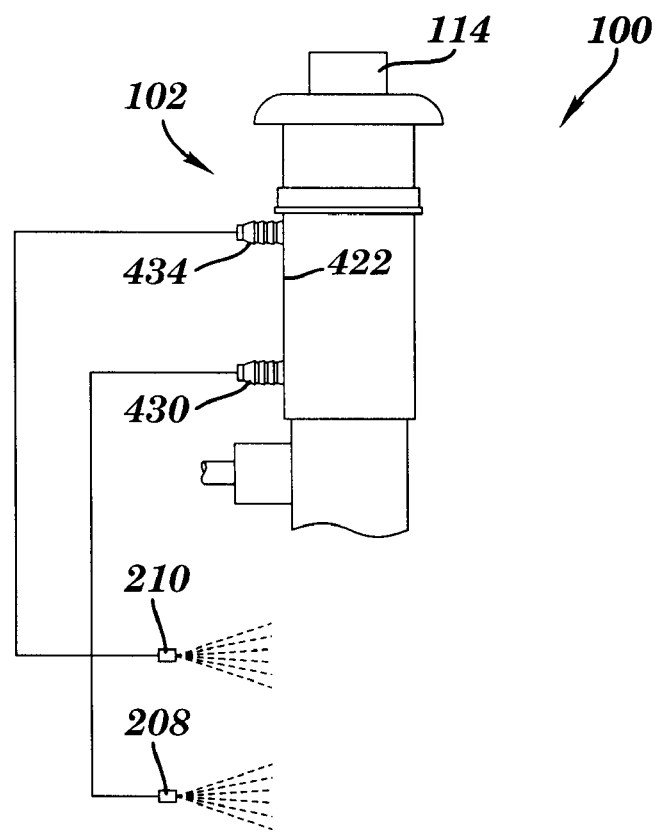
FIG. 16 is analogous to FIG. 10, and represents two inlets of the inner pipe aligned with the proximate and distal outlets of the set of outlets of the outer pipe.
Figure 15:
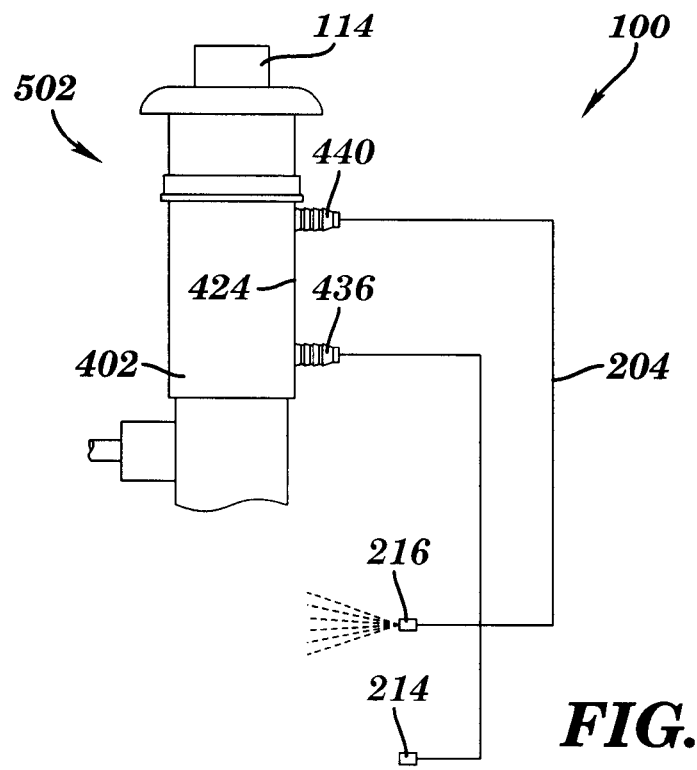
FIG. 15 is analogous to FIG. 11, and represents one inlet of the inner pipe aligned with the distal outlet of the set of outlets of the outer pipe.
Figure 17:
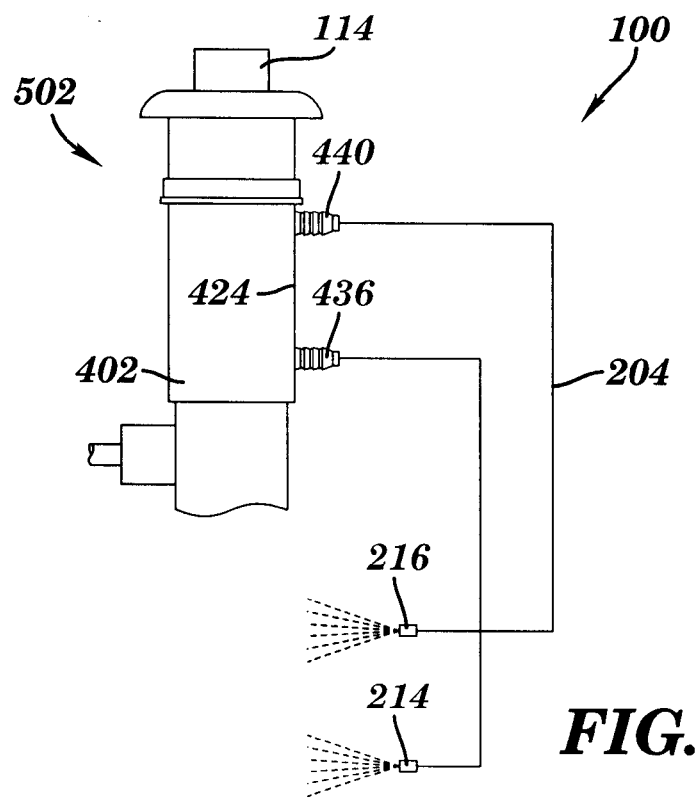
FIG. 17 is analogous to FIG. 11 and represents two inlets of the inner pipe aligned with the proximate and distal outlets of the set of outlets of the outer pipe.
Figure 18:
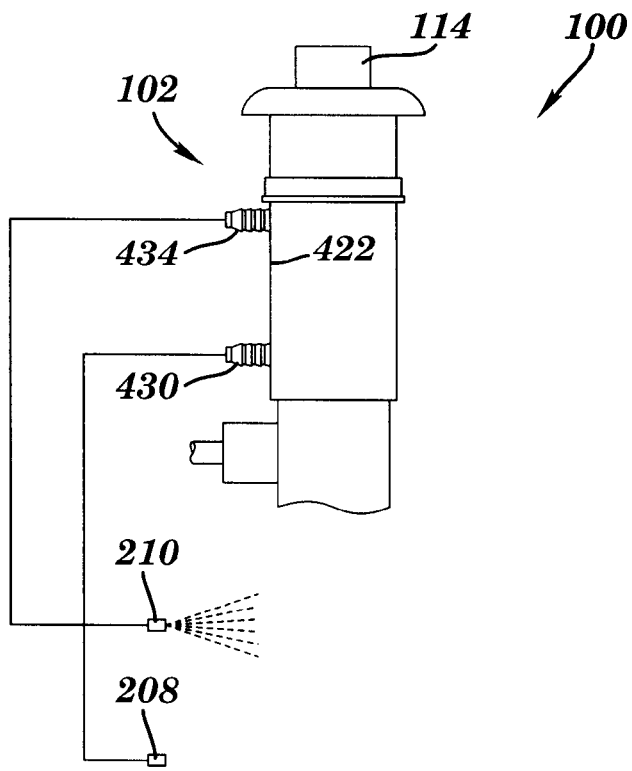
FIG. 18 is analogous to FIG. 10, and represents one inlet of the inner pipe aligned with the distal outlet of the set of outlets of the outer pipe.
Figure 20:
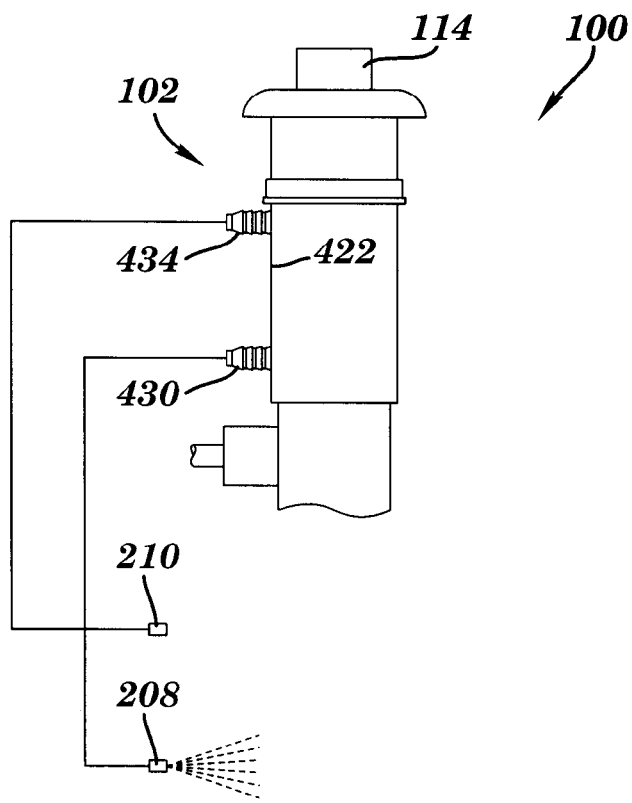
FIG. 20 is analogous to FIG. 10 and represents one inlet of the inner pipe aligned with the proximate outlet of the set of outlet of the outer pipe.
Figure 19:
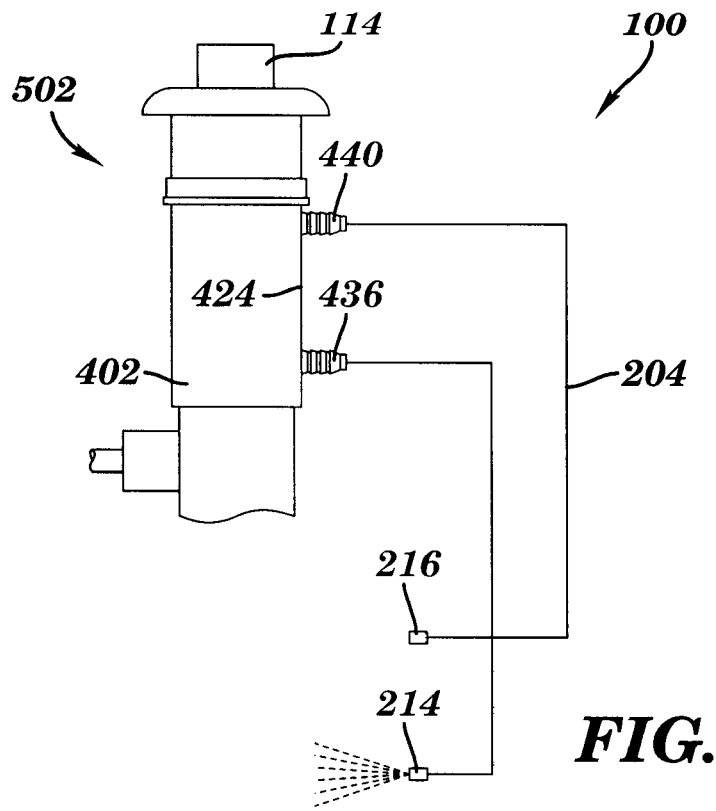
FIG. 19 is analogous to FIG. 11 and represents one inlet of the inner pipe aligned with the proximate outlet of the set of outlets of the outer pipe.
Figure 21:
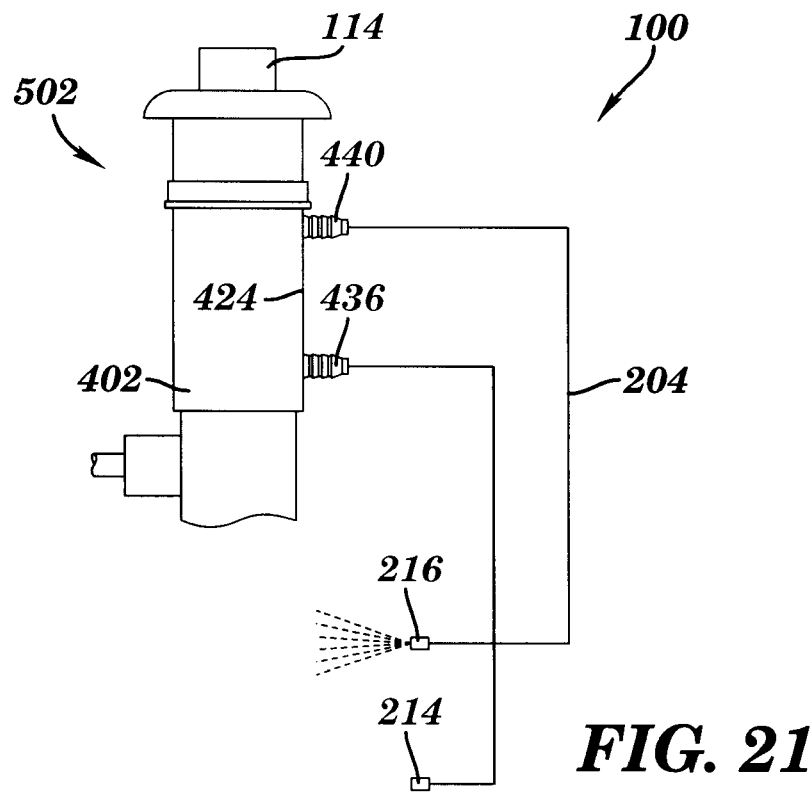
FIG. 21 is analogous to FIG. 11 and represents one inlet of the inner pipe aligned with the distal outlet of the set of outlets of the outer pipe.
Figure 28:
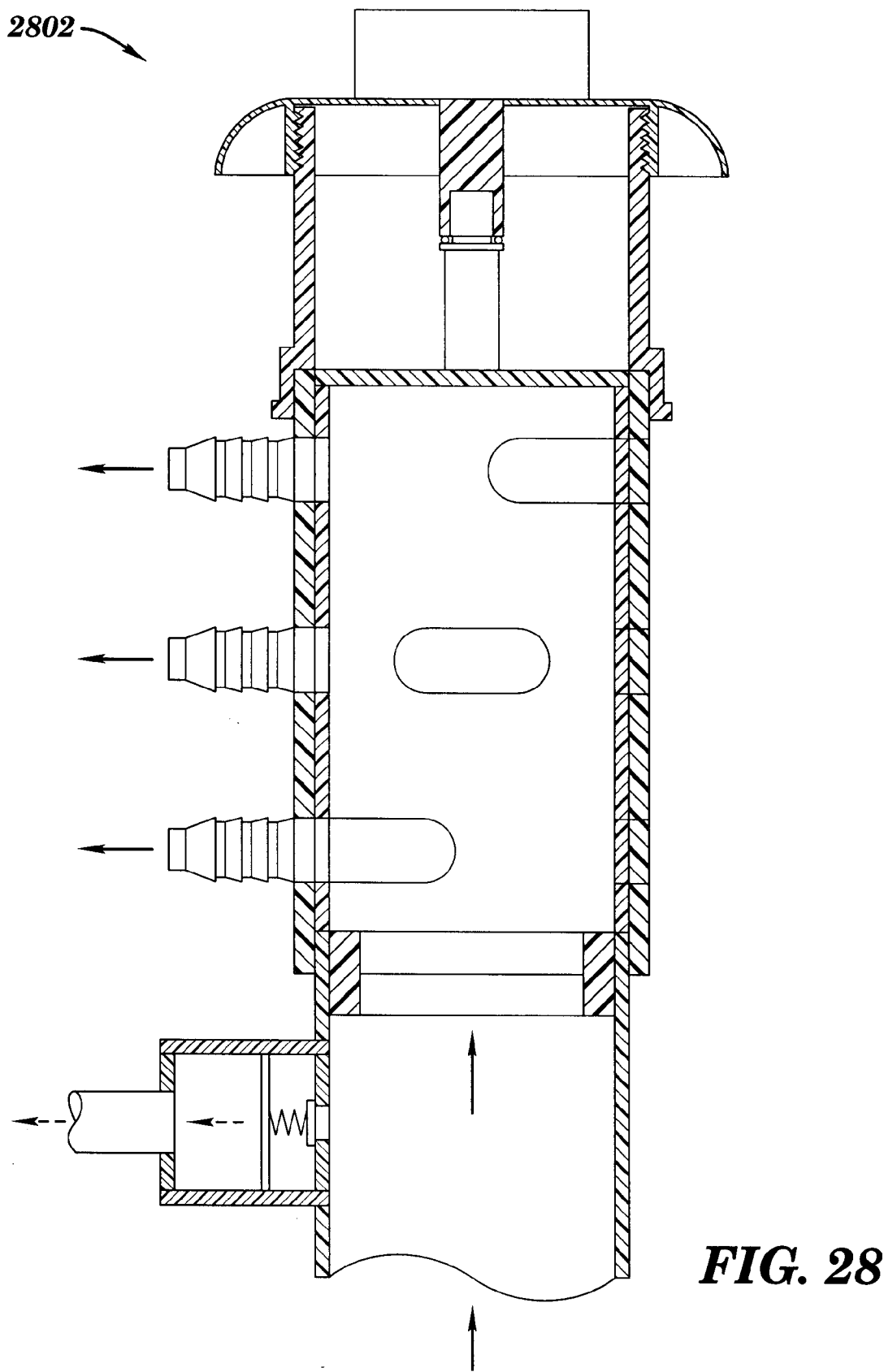
FIG. 28 is a partial, cutaway, side view of a further example of a flow control device.

Similar to the exemplary mapping represented in FIGS. 8 and 9, additional illustrative mapping of inlets 406 of inner pipe 404 is represented in FIG. 29. For instance, the mapping of FIG. 29 may be employed in a flow control device 2802 such as is depicted in FIG. 28.

Referring to FIGS. 1–5 and the discussion above referencing FIGS. 8–21, positions as described above may be marked or indicated on controller 116 or a display for controller 116. The markings or indications may facilitate or ease programming of the controller by a user. In addition, the markings or indications may serve to assist selection by a user of ports 108 for flow of water to interior 112 of the tub, spa or shower. Also, controller 116 may be one of a plurality of controllers.

Figure 30:
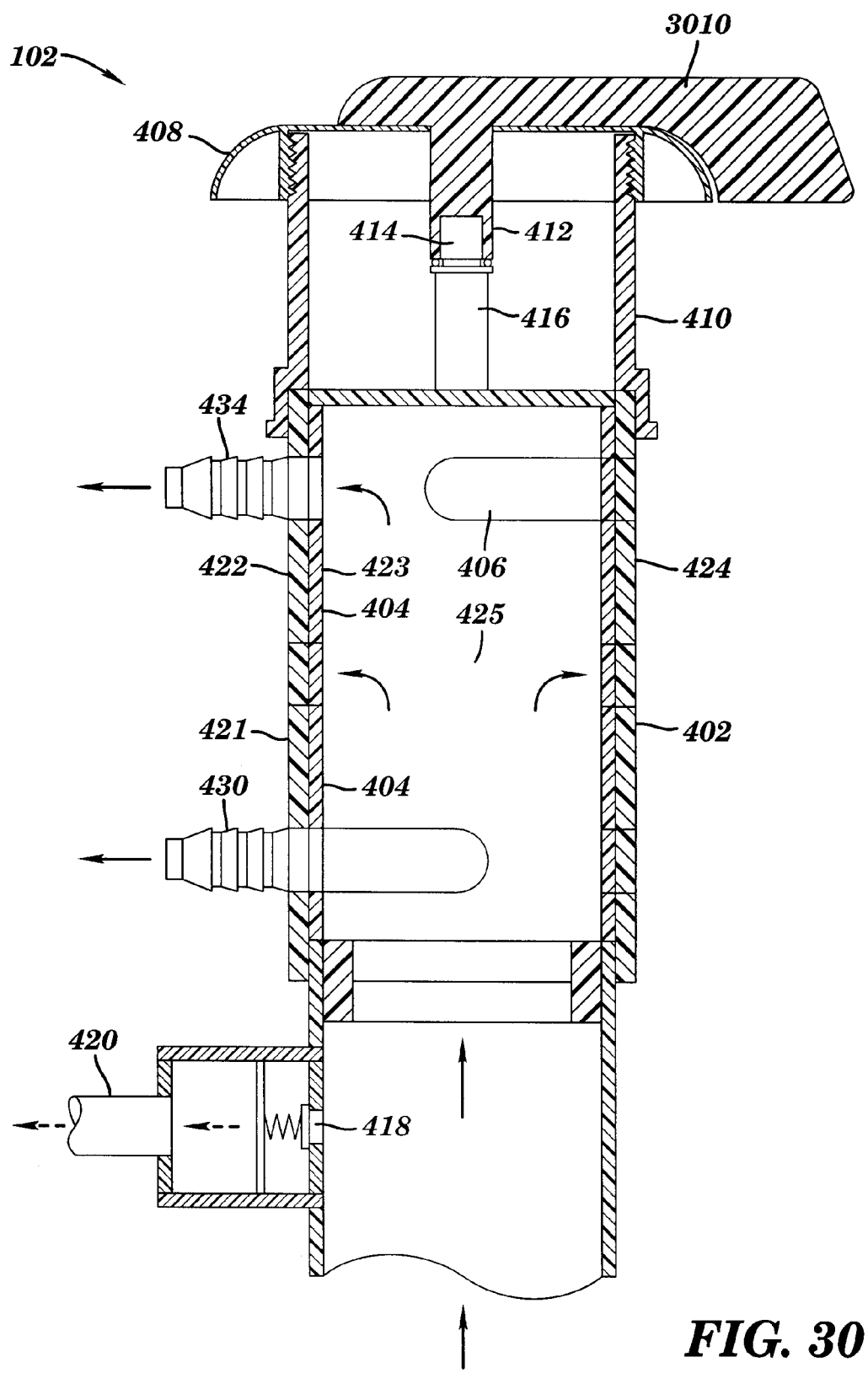
FIG. 30 is a partial, cutaway, side view of another example of a flow control device including a handle.

From the present description, it will be appreciated by those skilled in the art that as an alternative to the use of motor 114 and controller 116, a handle 3010 may be connected to a first pipe or a second pipe of a flow control device to allow the user to move the first pipe or the second pipe among the plurality of positions described above, as illustrated in FIG. 30.

Figure 25:
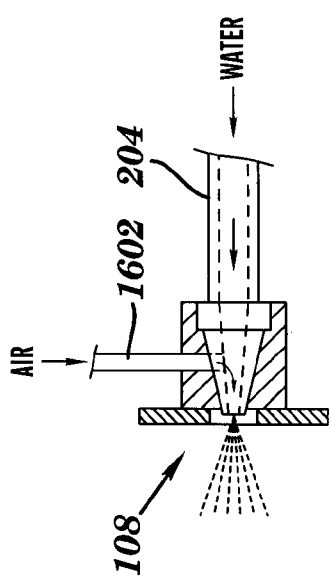
FIG. 25 is a partial, sectional, cutaway view of one example of a water tube coupled with a port of the tub, spa or shower, illustrating flow of water through the tube serving to draw air from an air supply conduit in fluid communication with the tube.
Figure 27:
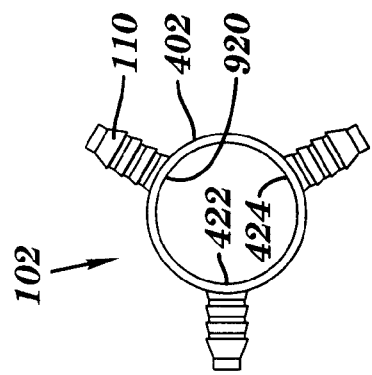
FIG. 27 is a partial, cutaway, sectional, top view of yet another example of an outer pipe of a flow control device, illustrating outlets of the outer pipe generally directed in directions having an obtuse angle therebetween.
Figure 26:
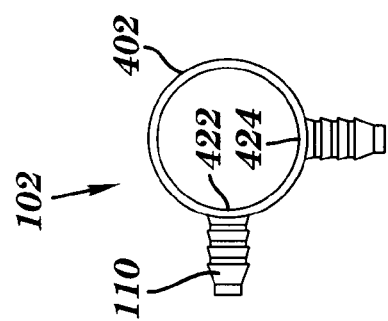
FIG. 26 is a partial, cutaway, sectional, top view of another example of an outer pipe of a flow control device, illustrating sets of outlets of the outer pipe generally directed in orthogonal directions.
Figure 7:
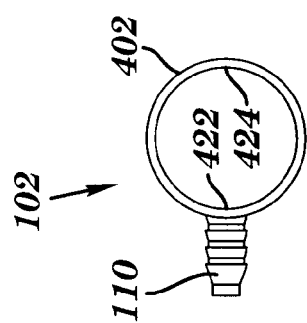
FIG. 7 is a partial, cutaway, sectional, top view of the outer pipe of the flow control device of FIG. 4.

In one example, referring to FIGS. 2 and 25, a connector 204 in fluid communication with a port 108 may be in fluid communication with air supply conduit 1602. For instance, the air supply conduit may be in fluid communication with the atmosphere. In one example, flow of pressurized water through the connector may serve to draw air from the air supply conduit for transmission of air with the water through the port to interior 112 of the tub, spa or shower. The port may resemble a venturi. For example, the port may have a throat which is constricted along the direction of flow, to cause an increase in velocity of the water flowing in the connector to effect a decrease in pressure that may draw air from the air supply conduit.

While parts of the description herein, for explanatory purposes, may imply certain exemplary directions, such directions may be considered relative. As will be appreciated by those skilled in the art, the significance of, for example, a "vertically upward" direction in many environments may stem from its opposition to a dominant "downwardly" acting gravitational force, resulting from the presence of a large mass such as the Earth, with "vertical" approximating radial alignment therewith. Furthermore, a "horizontal" direction and a "vertically upward" direction may be readily ascertained following determination of an appropriate "downward" direction. A number of design choices may allow accommodations of any orientations for any systems, ports, tubs, spas, showers, flow control devices, and/or portions thereof.

A force application and/or fluid flow may serve to cause advantageous effect(s). In one aspect, such force application and/or fluid flow may cooperate with other force application (s) and/or fluid flow(s) to achieve desired outcome(s). That is, a certain cause may be a contributor to desired result(s), occupying any of a number of positions within hierarchical arrangement(s) of causation(s) for outcome(s), benefit(s), advantage(s), and/or the like.

As will be appreciated by those skilled in the art, feature (s), characteristic(s), and/or advantage(s) of (e.g., portions of) the systems, ports, tubs, spas, showers, and/or flow control devices described herein, may be applied and/or extended to any embodiment (e.g., and/or portion thereof).

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method for controlling fluid delivery to a plurality of sets of ports of a hydrotherapy spa, the method comprising:
   providing a plurality of sets of ports within an individual seating location of a spa wherein at least one port of a first set of the ports is positioned to discharge fluid towards a first area of a person's body within the seating location and at least a second port of a second set of the ports is positioned to discharge fluid towards a second area of the person's body within the seating location;
   providing fluid to a plurality of flow control devices, wherein each of the flow control devices comprises:
      a first pipe including a plurality of elongated inlets;
      a second pipe including a plurality of outlets in fluid communication with at least one set of ports of the plurality of sets of ports; and
      at least of one of the first pipe and the second pipe being moveable, one relative to the other, among a plurality of positions;
      wherein at least one elongated inlet of the plurality of elongated inlets is in fluid communication with at least one outlet of the plurality of outlets through the plurality of positions;
   directing the fluid to the at least one port of the first set of ports of the plurality of sets of ports by moving a first pipe or a second pipe of a first flow control device of the plurality of flow control devices to a first position; and
   directing the fluid to the at least a second port of the second set of ports by moving the first pipe or the second pipe of the first flow control device to a second position.

2. The method of claim 1 wherein each of the first area and the second area comprise at least one of a chest area, a lower back area, and an ankle area of the person within the seating location.

3. The method of claim 1 further comprising moving the first pipe or the second pipe of the first flow control device to a third position to direct the fluid toward a third area of the person's body, wherein the third area comprises at least one of a chest area, a lower back area, and an ankle area of the person's body.

4. The method of claim 1 further comprising moving the first pipe or the second pipe of a second flow control device to a third position to direct the fluid toward at least one of a chest area, a lower back area, and an ankle area of a second person within a second seating location.

5. The method of claim 1 wherein the moving the first pipe or the second pipe of the first flow control device to the first position causes fluid communication of an elongated inlet of the plurality of elongated inlets of the first flow control device with a first outlet of the plurality of outlets of the first flow control device, the first outlet being in fluid communication with the at least one port, the communication of the elongated inlet with the first outlet serving to allow fluid flow to the elongated inlet to the first outlet to the at least one port toward the seating location.

6. The method of claim 1 wherein the moving the first pipe or the second pipe of a second flow control device to a third position causes fluid communication of a second elongated inlet of the plurality of elongated inlets of the second flow control device with a second outlet of the plurality of outlets of the second flow control device, the second outlet being in fluid communication with at least a third port, the communication of the second elongated inlet with the second outlet serving to allow fluid flow to the elongated inlet to the second outlet to the at least a third port toward a second seating location of the hydrotherapy spa.

7. The method of claim 1 further comprising providing a second plurality of sets of ports within a second individual seating location of the spa wherein at least one port of a third set of the ports is positioned to discharge fluid toward a first area of a second person's body within the second seating location and a least one port of a fourth set of the ports is positioned to discharge fluid towards a second area of the second person's body within the second seating location.

8. The method of claim 7 further comprising directing the fluid to the at least one port of the third set of ports of the second plurality of sets of ports by moving a first pipe or a second pipe of a second flow control device of the plurality of control devices to a first position.

9. The method of claim 7 further comprising directing the fluid to the at least one port of the fourth set of ports of the second plurality of sets of ports by moving the first pipe or the second pipe of the second control device to a second position.

10. A method for controlling fluid delivery to a plurality of ports of a hydrotherapy spa, the method comprising:

providing a plurality of ports within an individual seating location of a spa wherein at least a first port of the plurality of ports is positioned to discharge fluid towards a first area of a person's body within the seating location and providing a second plurality of ports within a second individual seating location of the spa wherein at least a second port of the second plurality of ports is positioned to discharge fluid towards a second area of a second person's body within the second seating location;

providing fluid to a plurality of flow control devices, wherein each of the flow control devices comprises:
a first pipe including a plurality of elongated inlets;
a second pipe including a plurality of outlets in fluid communication with at least one port of the plurality of sets of ports; and
at least of one of the first pipe and the second pipe being moveable, one relative to the other, among a plurality of positions;

wherein at least one elongated inlet of the plurality of elongated inlets is in fluid communication with at least one outlet of the plurality of outlets through the plurality of positions;

directing the fluid to the at least a first port by moving a first pipe or a second pipe of a first flow control device of the plurality of flow control devices to a first position; and directing the fluid to the at least a second port by moving the first pipe or the second pipe of a second flow control device of the plurality of flow control devices to a second position.

11. A method for controlling fluid delivery to a plurality of sets of ports of a hydrotherapy spa, the method comprising:

providing a plurality of sets of ports within an individual seating location of a spa wherein at least one port of a first set of the ports is positioned to discharge fluid towards a first area of a person's body within the seating location and at least a second port of a second set of the ports is positioned to discharge fluid towards a second area of the person's body within the seating location;

providing fluid to a plurality of flow control devices, wherein each of the flow control devices comprises:
a first pipe including a plurality of inlets;
a second pipe including a plurality of outlets in fluid communication with at least one set of ports of the plurality of sets of ports; and
at least of one of the first pipe and the second pipe being moveable, one relative to the other, among a plurality of positions;

wherein at least one inlet of the plurality of inlets is in fluid communication with at least one outlet of the plurality of outlets through the plurality of positions;

directing the fluid to the at least one port of the first set of ports of the plurality of sets of ports by moving a first pipe or a second pipe of a first flow control device of the plurality of flow control devices to a first position; and directing the fluid to the at least a second port of the second set of ports by moving the first pipe or the second pipe of the first flow control device to a second position.

12. The method of claim 11 wherein each of the first area and the second area comprise at least one of a chest area, a lower back area, and an ankle area of the person within the seating location.

13. The method of claim 11 further comprising moving the first pipe or the second pipe of the first flow control device to a third position to direct the fluid toward a third area of the person's body, wherein the third area comprises at least one of a chest area, a lower back area, and an ankle area of the person's body.

14. The method of claim 11 further comprising moving the first pipe or the second pipe of a second flow control device to a third position to direct the fluid toward at least one of a chest area, a lower back area, and an ankle area of a second person within a second seating location.

15. The method of claim 11 wherein the moving the first pipe or the second pipe of the first flow control device to the first position causes fluid communication of an inlet of the plurality of inlets of the first flow control device with a first outlet of the plurality of outlets of the first flow control device, the first outlet being in fluid communication with the at least one port, the communication of the inlet with the first outlet serving to allow fluid flow to the inlet to the first outlet to the at least one port toward the seating location.

16. The method of claim 11 wherein the moving the first pipe or the second pipe of a second flow control device to a third position causes fluid communication of a second inlet of the plurality of inlets of the second flow control device with a second outlet of the plurality of outlets of the second flow control device, the second outlet being in fluid communication with at least a third port, the communication of the second elongated inlet with the second outlet serving to allow fluid flow to the elongated inlet to the second outlet to the at least a third port toward a second seating location of the hydrotherapy spa.

17. The method of claim 11 further comprising providing a second plurality of sets of ports within a second individual seating location of the spa wherein at least one port of a third set of the ports is positioned to discharge fluid toward a first area of a second person's body within the second seating location and a least one port of a fourth set of the ports is positioned to discharge fluid towards a second area of the second person's body within the second seating location.

18. The method of claim 17 further comprising directing the fluid to the at least one port of the third set of ports of the second plurality of sets of ports by moving a first pipe or a second pipe of a second flow control device of the plurality of control devices to a first position.

19. The method of claim 17 further comprising directing the fluid to the at least one port of the fourth set of ports of the second plurality of sets of ports by moving the first pipe or the second pipe of the second control device to a second position.

20. A method for controlling fluid delivery to a plurality of ports of a hydrotherapy spa, the method comprising:

providing a plurality of ports within an individual seating location of a spa wherein at least a first port of the plurality of ports is positioned to discharge fluid towards a first area of a person's body within the seating location and providing a second plurality of ports within a second individual seating location of the spa wherein at least a second port of the second plurality of ports is positioned to discharge fluid towards a second area of a second person's body within the second seating location;

providing fluid to a plurality of flow control devices, wherein each of the flow control devices comprises:
   a first pipe including a plurality of inlets;
   a second pipe including a plurality of outlets in fluid communication with at least one port of the plurality of sets of ports; and
   at least of one of the first pipe and the second pipe being moveable, one relative to the other, among a plurality of positions;
   wherein at least one inlet of the plurality of inlets is in fluid communication with at least one outlet of the plurality of outlets through the plurality of positions;

directing the fluid to the at least a first port by moving a first pipe or a second pipe of a first flow control device of the plurality of flow control devices to a first position; and directing the fluid to the at least a second port by moving the first pipe or the second pipe of a second flow control device of the plurality of flow control devices to a second position.

* * * * *

UNITED STATES PATENT AND TRADEMARK OFFICE
CERTIFICATE OF CORRECTION

PATENT NO. : 6,675,404 B2
DATED : January 13, 2004
INVENTOR(S) : Brennan et al.

It is certified that error appears in the above-identified patent and that said Letters Patent is hereby corrected as shown below:

Column 14,
Line 46, delete the word "of" in the first instance

Column 15,
Line 34, delete the word "a" and insert -- at --
Line 65, delete the word "of" in the first instance Column 16,
Line 31, delete the word "of" in the first instance Column 17,
Line 19, delete the word "a" and insert -- at --

Column 18,
Line 18, delete the word "of" in the first instance

Signed and Sealed this

Twenty-seventh Day of July, 2004

JON W. DUDAS
*Acting Director of the United States Patent and Trademark Office*